US010117378B2

(12) United States Patent
Khaleel

(10) Patent No.: US 10,117,378 B2
(45) Date of Patent: Nov. 6, 2018

(54) FERTIGATION COMPOSITION, USE AND SYSTEM

(71) Applicant: SAUDI BASIC INDUSTRIES CORPORATION, Riyadh (SA)

(72) Inventor: Mohamed Akasha M. Khaleel, Riyadh (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 99 days.

(21) Appl. No.: 14/787,637

(22) PCT Filed: Apr. 25, 2014

(86) PCT No.: PCT/IB2014/001392
§ 371 (c)(1),
(2) Date: Oct. 28, 2015

(87) PCT Pub. No.: WO2014/177932
PCT Pub. Date: Nov. 6, 2014

(65) Prior Publication Data
US 2016/0073578 A1    Mar. 17, 2016

Related U.S. Application Data

(60) Provisional application No. 61/817,537, filed on Apr. 30, 2013.

(51) Int. Cl.
*A01C 23/04* (2006.01)
*C05G 3/00* (2006.01)
*C05B 17/00* (2006.01)

(52) U.S. Cl.
CPC ........... *A01C 23/042* (2013.01); *C05B 17/00* (2013.01); *C05G 3/0076* (2013.01)

(58) Field of Classification Search
CPC .................................................... A01C 23/04
See application file for complete search history.

(56) References Cited

U.S. PATENT DOCUMENTS 2,722,456 A    11/1955  Glessner
2,909,002 A  * 10/1959  Hendry ............... A01C 23/042
                                                                    405/51
(Continued)

FOREIGN PATENT DOCUMENTS

AR    PI4010752    4/2014
AU    2014261114   4/2014
(Continued)

OTHER PUBLICATIONS

Burt, C.M., Chemicals for Fertigation, Proc Intl Irrigation Show: IA's 19th Annual Conference (8 pages) (1998).
(Continued)

*Primary Examiner* — Wayne A Langel
(74) *Attorney, Agent, or Firm* — Norton Rose Fulbright US LLP

(57) ABSTRACT

Disclosed herein is a method for fertigation comprising: (a) providing an acidic mixture of water and a fertilizer dissolving agent; (b) contacting the acidic mixture with a fertilizer composition in fertigation equipment to dissolve the fertilizer composition and to form a fertigation composition; and (c) contacting the fertigation composition with soil. Also disclosed are a fertigation composition and a fertilizer system.

23 Claims, 2 Drawing Sheets

(56) References Cited

U.S. PATENT DOCUMENTS

| | | | |
|---|---|---|---|
| 4,594,090 A | | 6/1986 | Johnson |
| 4,723,710 A | | 2/1988 | Lucore, II |
| 4,917,304 A | * | 4/1990 | Mazzei .............. A01C 23/042 239/304 |
| 5,851,260 A | | 12/1998 | Aijala et al. |
| 6,029,904 A | * | 2/2000 | Taylor .............. A01C 23/042 239/127 |
| 8,721,758 B1 | * | 5/2014 | Miller .............. A01C 23/042 239/727 |
| 9,004,374 B1 | * | 4/2015 | Gans .............. A01C 23/042 239/10 |
| 9,439,345 B1 | * | 9/2016 | Miller .............. A01C 23/042 |
| 9,856,179 B2 | * | 1/2018 | Miller .............. C05C 9/00 |
| 2002/0186614 A1 | * | 12/2002 | Millward .............. A01C 23/042 366/167.1 |
| 2009/0145190 A1 | | 6/2009 | Persinger |
| 2010/0273885 A1 | | 10/2010 | Davis |
| 2010/0291230 A1 | | 11/2010 | Assaraf et al. |
| 2014/0238514 A1 | * | 8/2014 | Yarbrough, Jr. ..... A01C 23/042 137/565.01 |

FOREIGN PATENT DOCUMENTS

| | | |
|---|---|---|
| BD | 119/2014 | 4/2014 |
| CN | 1609072 | 4/2005 |
| CN | 1875688 | 12/2006 |
| CN | 201773293 U | 3/2011 |
| CN | 102372523 A | 3/2012 |
| CN | 102515905 A | 6/2012 |
| DE | 102009026234 A1 | 2/2011 |
| EP | 0949221 A1 | 10/1999 |
| EP | 1486477 A1 | 12/2004 |
| EP | PCT/IB2014/001392 | 4/2014 |
| FR | 2682554 A1 | 4/1993 |
| GC | 2014-27071 | 4/2014 |
| IN | 8738/DELNP/2015 | 4/2014 |
| JO | PA/153/2014 | 4/2014 |
| WO | WO 01/25168 | 4/2001 |
| WO | PCT/IB2014/001392 | 4/2014 |

OTHER PUBLICATIONS

International Search Report and Written Opinion dated Dec. 10, 2014 by the International Searching Authority for International Patent Application No. PCT/IB2014/001392, which was field on Apr. 25, 2014 and published as WO 2014/177932 dated Nov. 6, 2014 (Inventor—Mohamed A. M. Khaleel; Applicant—Saudi Basic Industries Corp.) (11 pages).

Office Action issued in Chinese Application No. 201480023254.3, dated Nov. 1, 2017.

Office Action issued in European Application No. 14759270.3, dated Nov. 24, 2017.

Office Action issued in European Patent Application No. 14759270.3, dated May 3, 2018.

U.S. Appl. No. 61/817,537, filed Apr. 30, 2013, Mohamed A. M. Khaleel.

\* cited by examiner

FERTIGATION COMPOSITION, USE AND SYSTEM

CROSS-REFERENCE TO RELATED APPLICATIONS

This is a U.S. National Phase Application of International Application No. PCT/IB2014/001392, filed Apr. 25, 2014, which claims the benefit of U.S. Provisional Application No. 61/817,537, filed on Apr. 30, 2013, which are both incorporated herein by reference in their entirety

BACKGROUND

There is a long-standing need in the farming industry for stable, water-soluble fertilizer compositions that provide simultaneous delivery of water and mineral nutrients to crops. These water-soluble fertilizer compositions should demonstrate stability when subjected to standard formulation and storage practices and rapid nutrient release when used in standard fertilizer composition. To achieve this rapid release profile, a "fertigation" process was developed to circumvent problems encountered with broadcasting, or direct application of a fertilizer composition to topsoil, such as inconsistent nutrient absorption by roots of plants that have different distances from the area of application and/or destructive compression of soil beds by heavy farming equipment used to spread fertilizer composition, particularly over large areas, such as those of large farms.

While conventional fertigation was designed to be a viable addition to the means of delivery of mineral nutrients to crops, it is not without some limitations. For example, fertilizer compositions comprising binders and other nutrient-carrying materials well-suited for topical application as granules are less suited for similar purposes when dissolved in water. Once dissolved in water, and thereby liberated from binders, components of many fertilizer compositions react with each other and provide new, water-insoluble materials that precipitate from the solution at different rates. This phenomenon can result in a reduction in the efficiency of water and nutrient delivery because of operational issues, such as, for example, clogging of the fertigation equipment. Also, fertilizer compositions useful for broadcasting can have limited solubility in water. Thus, there is an existing need in the fertilizer delivery arts for economical fertigation compositions which do not inhibit fertigation processes by clogging fertigation equipment.

SUMMARY OF THE INVENTION

In accordance with the present invention, as embodied and broadly described herein, there is provided a method for fertigation comprising:
  a. providing an acidic mixture of water and an acidic fertilizer dissolving agent;
  b. contacting the acidic mixture with a fertilizer composition in fertigation equipment to dissolve the fertilizer composition and to form a fertigation composition; and
  c. contacting the fertigation composition with soil.

Also in accordance with the present invention, there is provided a fertigation composition comprising:
  a. a fertilizer composition, wherein the fertilizer composition is present in an amount ranging from about 10 wt % to about 50 wt %, based on the fertigation composition;
  b. a fertilizer dissolving agent, wherein the fertilizer dissolving agent is present in an amount ranging from about 2 wt % to about 88 wt %, based on the fertigation composition; and
  c. water, wherein the water is present in an amount ranging from about 2 wt % to about 88 wt %, based on the fertigation composition.

Also in accordance with the present invention, there is provided a fertigation system comprising:
  a. a fertigation storage-mixing tank having an inlet for receiving one or more fertigation components from a source;
  b. a fertigation pump having an inlet in selective communication with the fertigation storage-mixing tank and having a pump discharge outlet;
  c. a recirculation loop in selective communication with said pump discharge outlet and having a terminal recirculation loop discharge end located within said storage-mixing tank and defining a recirculation discharge inlet; and
  d. a fertigation feed line in selective communication with said pump discharge outlet and having a terminal fertigation discharge end in communication with a downstream irrigation system;
  wherein the system is selectively operable in a first and second operable configuration,
  wherein, in the first operable configuration, the fertigation pump inlet is in fluid communication with the fertigation storage mixing tank; the recirculation loop is in fluid communication the pump discharge outlet; and the fertigation feed line is not in fluid communication with the pump discharge outlet, such that the system is configured to recirculate one or more fertigation components within the fertigation storage-mixing tank; and
  wherein, in the second operable configuration, the fertigation pump inlet is in fluid communication with the storage mixing tank; the recirculation loop is not in fluid communication with the pump discharge outlet; and the fertigation feed line is in fluid communication with the pump discharge outlet, such that the system is configured to feed a dosage of one or more fertigation components to the downstream irrigation system.

While aspects of the present invention can be described and claimed in a particular statutory class, this is for convenience only, and one of skill in the art will understand that each aspect of the invention can be described and claimed in any statutory class. Unless otherwise expressly stated, it is in no way intended that any method or aspect set forth herein be construed as requiring that its steps be performed in a specific order. Accordingly, where a method does not specifically state in the descriptions or claims that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Additional advantages of the present invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

DETAILED DESCRIPTION

Figure 1:
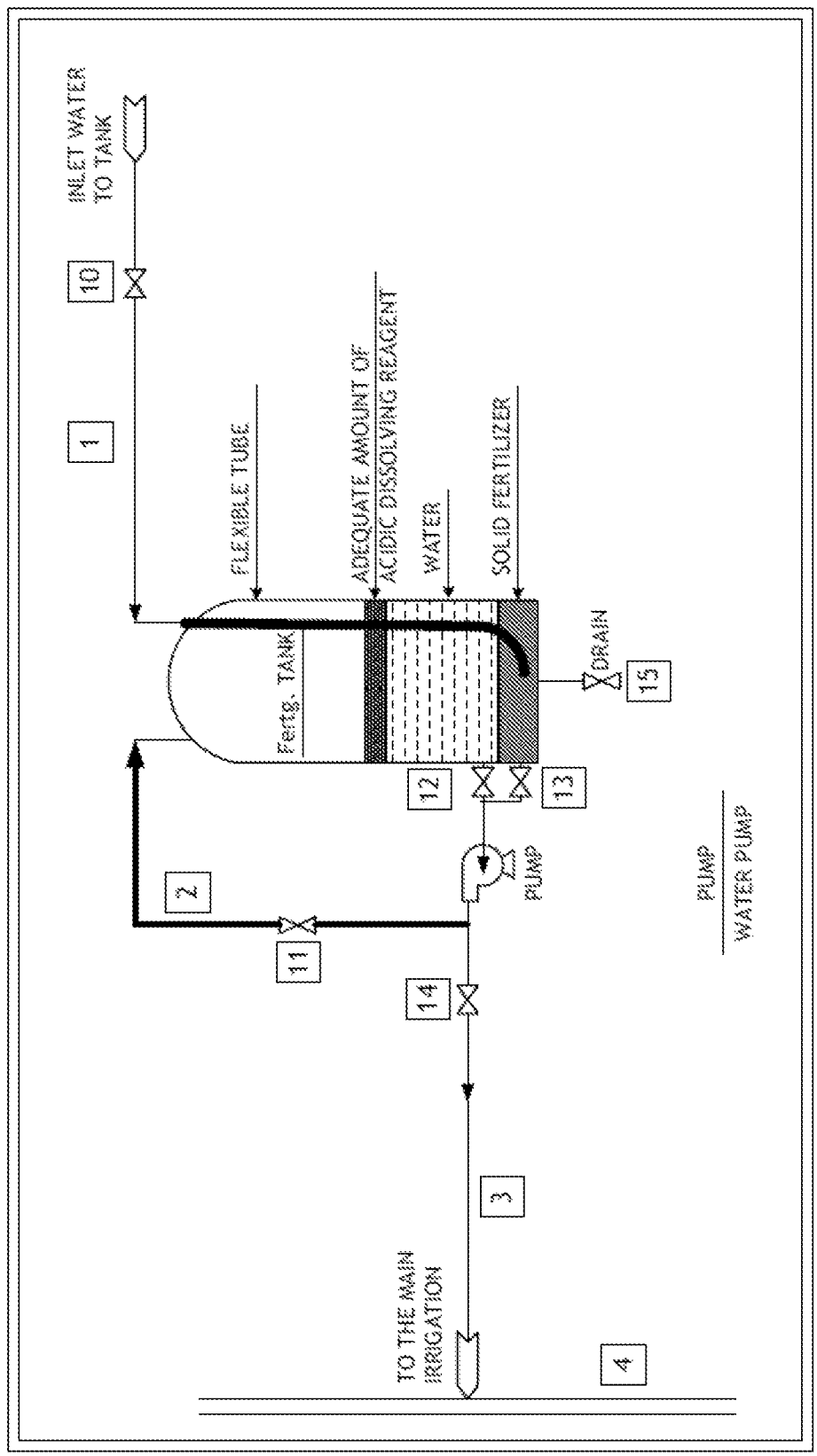
FIG. 1 shows a fertigation system of one embodiment of the present invention.

The present invention can be understood more readily by reference to the following detailed description of the invention and the examples included therein.

Before the present compositions, articles, systems, devices, and/or methods are disclosed and described herein, it is to be understood that they are not limited to particular reagents unless otherwise specified, as such may, of course, vary. It is also to be understood that terminology used herein is for the purpose of describing particular aspects only and is not intended to be limiting. Although any methods and materials similar or equivalent to those described herein can be used in the practice or testing of the invention, example methods and materials are now described.

All publications mentioned herein are incorporated by reference to disclose and describe the materials and/or methods in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Nomenclature for compounds, including organic compounds, can be given using common names, International Union of Pure and Applied Chemistry (IUPAC), or Chemical Abstracts (CAS) recommendations for nomenclature.

A. Definitions

In this specification, including the claims which follow, reference will be made to a number of terms which have the following meanings:

As used herein, singular forms "a," "an" and "the" include plural referents unless the context clearly dictates otherwise.

As used herein, "fertigation" is the application of a fertigation composition to the soil.

As used herein, "fertilizer dissolving agent" means a material which, when combined with a mixture comprising water and a solid fertilizer, causes a shift towards greater acidity of the mixture.

As used herein, "optional" and "optionally" mean that a subsequently described event can or cannot occur, and that the description includes instances where the event occurs and instances where it does not.

As used herein, "pH" means the negative logarithm of proton ion concentration and is a measure of the neutrality (i.e., pH equals 7), acidity (i.e., pH less than 7), or alkalinity (i.e., pH greater than 7) of an aqueous solution.

As used herein, "sulfuric acid" includes dilute or concentrated, for example, 18 molar sulfuric acid. The sulfuric acid can be diluted for example, by water, another acid, or another liquid. In one aspect, the sulfuric acid when diluted will have a pH ranging from a neutral pH to an acidic pH.

The compositions described herein can comprise materials present as solvates. In some cases, the solvent used to prepare the solvate is an aqueous solution, and the solvate is then often referred to as a hydrate. The materials can be present as hydrates, which can be obtained, for example, by crystallization from a solvent or from aqueous solution. In this connection, one, two, three or any arbitrary number of solvent or water molecules can combine with the materials comprising the compositions of the invention to form solvates and hydrates. Unless stated to the contrary, the invention includes all such possible solvates.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, 14, and fractions thereof, are also disclosed.

As used herein, references to parts by weight of a particular component in a composition means the weight relationship between the component and any other components in the composition for which a part by weight is expressed. Thus, in a composition expressed as 2 parts by weight Component X and 5 parts by weight Component Y, X and Y are present in a weight ratio of 2:5 or 1:2.5 or 0.4 and are present in such ratio regardless of whether additional components are contained in the compound.

A weight percent (wt %) of a component, unless specifically stated to the contrary, is based on the total weight of the formulation or composition in which the component is included.

As used herein, references to percent by weight of a particular component in a composition means the weight relationship between the component and any other components in the composition for which a part by weight is expressed. Thus, in a composition expressed as 10%/90% X/Y (w/w), X and Y are present as 10% by weight and 90% by weight, respectively; a composition expressed as a percent of a component in water, such as 15% Component X in water, means the weight percent is 15%/85% X/water (w/w) or 15%/85% X/water (w/v), wherein "v" stands for water volume, because the weight of water is considered as being substantially equivalent to its volume.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are materials used to prepare the compositions of the present invention as well as the compositions themselves to be used in the methods disclosed herein. It is understood that when combinations, subsets, interactions, groups, etcetera of these materials are disclosed, that while specific reference of each various individual and collective combinations and permutation of these compounds cannot be explicitly disclosed, each is specifically contemplated and described herein. For example if a class of materials A, B, and C are disclosed as well as a class of materials D, E, and F and an example of a composition comprising A and D is disclosed, then even if each is not individually recited each is individually and collectively contemplated meaning combinations A and E, A and F, B and D, B and E, B and F, C and D, C and E, and C and F are considered disclosed. Likewise, any subset or combination of these is also disclosed. Thus, for example, the sub-group comprising A and E, B and F, and C and E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

B. Fertigation Method

In accordance with the present invention, disclosed herein is a method for fertigation comprising: (a) providing an acidic mixture of water and an acidic fertilizer dissolving agent; (b) contacting the acidic mixture with a fertilizer composition in fertigation equipment to dissolve the fertilizer composition and to form a fertigation composition; and (c) contacting the fertigation composition with soil.

Fertigation, as used herein, comprises the application of a fertigation composition to the soil. In one aspect, fertigation comprises transporting a fertigation composition through an irrigation system. In another aspect, fertigation comprises contacting a fertigation composition with the soil using an irrigation system.

Fertigation can provide control of nutrients and water, which are the main grower-controlled inputs to plant growth. A benefit of fertigation can be greater flexibility and control of applied nutrients than conventional broadcast applications. A fertilizer composition can be applied when needed and in small doses, so water-soluble nutrients are less subject to leaching by excess rainfall or over-irrigation. A drawback of fertigation can be clogging resulting from reactions between the fertilizer composition with impurities and/or contaminants in the irrigation water. Without wishing to be bound by theory, precipitate formation can be caused, in part, by chemical reactions, known as ionic metathesis or double-replacement reactions, between the water-soluble fertilizer composition, such as the phosphate ion, and impurities and/or contaminants in the irrigation water, such as calcium ion, that can result in the formation of water-insoluble calcium phosphate, which can plug the irrigation system.

In one aspect, the method provides an acidic mixture of water and a fertilizer dissolving agent. In another aspect, the mixture is acidic due to the mixing of water with the fertilizer dissolving agent.

In one aspect, the fertilizer dissolving agent comprises sulfuric acid, hydrochloric acid, nitric acid, or phosphoric acid, or a mixture thereof. In a further aspect, the fertilizer dissolving agent comprises sulfuric acid or phosphoric acid, or a mixture thereof. In an even further aspect, the fertilizer dissolving agent comprises sulfuric acid.

In one aspect, the fertilizer dissolving agent is capable of substantially or completely dissolving a fertilizer composition.

In one aspect, the mixing can use conventional methods. For example, the mixing can take place using an electric motor stirrer or providing a mixing tank with an electric stirrer.

In a further aspect, the fertilizer dissolving agent is added to the water to prepare the acidic mixture. In another aspect, after the fertilizer dissolving agent and water were combined, a pump circulates the water and fertilizer dissolving agent for about 1 minute to 20 minutes, including exemplary values of 2 min, 4 min, 6 min, 8 min, 10 min, 12 min, 14 min, 16 min, and 18 min. In a further aspect, the pump circulates the water and fertilizer dissolving agent for 10 min to 15 min.

In one aspect, the method comprises contacting the acidic mixture with a fertilizer composition in fertigation equipment to dissolve the fertilizer composition and to form a fertigation composition. In another aspect, the contacting can occur by mixing the acidic mixture and the fertilizer composition, by combining the acidic mixture and the fertilizer composition, or by placing the acidic mixture and fertilizer composition in the same container.

In one aspect, a fertilizer composition is a composition comprising plant nutrients. In a further aspect, the fertilizer composition comprises a blended combination of a nitrogen (N) source, a phosphorus (P) source, and a potassium (K) source. In another aspect, any fertilizer composition with a nitrogen source, phosphorus source, and potassium source can be used in the method. In one aspect, the fertilizer composition is insoluble in water prior to the adding the fertilizer composition to the acidic mixture. In a further aspect, the fertilizer composition is partly insoluble in water prior to the adding the fertilizer composition to the acidic mixture. In a yet further aspect, the fertilizer composition is solid and/or granular.

In one aspect, the fertilizer composition is present in an amount ranging from 10 wt % to 50 wt %, based on the total fertigation composition, including exemplary values 15 wt %, 20 wt %, 25 wt %, 30 wt %, 35 wt %, 40 wt %, and 45 wt %. In a further aspect, the range can be derived from any two exemplary values. For example, the fertilizer composition can be present in an amount ranging from 15 wt % to 45 wt % based on the total fertigation composition.

In one aspect, the fertigation equipment comprises an irrigation tank or a portable fertigation tank or a combination thereof. In a further aspect, the fertigation tank can be portable or can be stationary. In another aspect, the fertilizer equipment comprises polyethylene, plastic, or any suitable chemical resistant material. In one aspect, fertilizer equipment comprises a chemical resistant material or an anticorrosive material, or a combination thereof. In another aspect, the chemical resistant material or the anticorrosive material further comprises stainless steel or polypropylene, or a mixture thereof.

In one aspect, the contacting the acidic mixture with a fertilizer composition dissolves the fertilizer composition to form a fertigation composition. In another aspect, the contacting can further comprise mixing, stirring, or combining the acidic mixture with a fertilizer composition.

The fertilizer composition can dissolve in a time ranging from 30 minutes to 12 hours, including exemplary values of 1 hr, 1.5 hrs, 2 hrs, 2.5 hrs, 3 hrs, 3.5 hrs, 4 hrs, 5 hrs, 6 hrs, 6.5 hrs, 7 hrs, 7.5 hrs, 8 hrs, 8.5 hrs. 9 hrs, 9.5 hrs, 10 hrs, 10.5 hrs, 11 hrs, and 11.5 hrs. In a further aspect, the time range can be derived from any two of the exemplary values. For example, the fertilizer composition can dissolve in a time ranging from 1 hour to 12 hours. In another aspect, there fertilizer composition can dissolve overnight.

In another aspect, the fertigation composition is homogeneous. In a further aspect, the fertigation composition does not comprise solid particles or precipitate, or a mixture thereof. In a yet further aspect, the fertigation composition is sufficiently dissolved to avoid clogging the fertigation equipment and/or an irrigation line.

In a further aspect, the fertigation composition can be contacted with the soil. The contacting can comprise any conventional method of contacting a fertigation composition with the soil. For example, the contacting can comprise spreading the fertigation composition on the soil, dispersing the fertigation composition on the soil, covering the fertigation composition on the soil, propagating the fertigation composition on the soil, or broadcasting the fertigation composition on the soil. The broadcasting can comprise distributing and incorporating the fertigation composition on the soil. The fertigation composition can contacted with the soil using an irrigation line.

Soil is a thin layer of matter that covers much of Earth's surface and is made of many different substances including pulverized rock particles and decayed plant and animal matter in various combinations. As such, there are different types of soil and different ways to classify it. One classification system is based on the size of the particles that make up soil. Another system is based on soil color (e.g., red, black or yellow). Categorizing soil by particle size is most common in gardening and farming, as it is the most predictable way to determine how well plants will thrive in it. Soil categorized by particle size is labeled as sandy, salty, clay, loamy, peaty, or chalky. Applicability of soil type to plant and crop growth depends on factors such as needs of the plant or crop, soil porosity or facility with which water moves through it, moisture retention, pH, salinity, nutrient content, and heat capacity or heat absorptivity and retention.

In one aspect, the method comprises cleaning the fertigation composition from the fertigation equipment.

In one aspect, cleaning the fertigation composition further comprises: (a) flushing an irrigation line with fresh water; and (b) sending the fertigation composition to an irrigation line.

In one aspect, the method comprises providing an acidic mixture further comprising: (a) filling the fertigation tank with water to the required level; (b) checking the pH and the calcium content of the water to determine when a desired pH and calcium content has been reached; (c) adding a fertilizer dissolving agent; and d) repeating steps b and c, as necessary, until the desired pH and calcium content has been reached.

In one aspect, the method comprises adding a fertilizer dissolving agent comprising sulfuric acid or phosphoric acid, or a mixture thereof.

In a further aspect, the fertigation tank is filled with water. The required water level is determined by the amount of the fertilizer composition which will be added and the amount of an acidic mixture needed to dissolve the fertilizer composition. In one aspect, the mixing tank can be provided with a measuring meter to show the water level. In another aspect, the mixing tank can be provided with a flow meter fixed to the inlet water pipe that feeds into the tank.

In one aspect, the fertigation composition has a pH ranging from 5.0 to 10.0, with exemplary values of 5.5, 6.0, 6.5, 7.0; 7.0, 7.5; 7.5, 8.0, 8.5, 9.0, and 9.5. In another aspect, the pH can be in a range derived from two exemplary values. For example, the fertigation composition has a pH ranging from 5.5 to 9.5.

In one aspect, the fertigation composition comprises calcium content ranging from 50 ppm to 1100 ppm, including exemplary values of 100 ppm, 200 ppm, 300 ppm, 400 ppm, 500 ppm, 600 ppm, 700 ppm, 800 ppm, 900 ppm, and 1000 ppm. In further aspects, the calcium content range can be chosen from any two exemplary values. For example, the fertigation composition comprises calcium content ranging from 100 ppm to 1000 ppm. In one aspect, the fertigation composition comprises calcium dissolved by the fertilizer dissolving agent. In another aspect, the fertigation composition comprises calcium present in the fertilizer composition. In a further aspect, the fertigation composition comprises calcium present in the fertilizer composition and calcium dissolved by the fertilizer dissolving agent.

In one aspect, the method comprising contacting the acidic mixture with a fertilizer composition further comprises: (a) resting the fertigation composition without stirring for a period of time ranging from about 8 hrs to about 36 hrs; and (b) mixing the fertigation composition in the fertigation tank for a period of time ranging from about 30 minutes to about 90 minutes.

In another aspect, the fertigation composition is rested. As used herein, resting the fertigation composition means to not stir the fertigation composition for a period of time. Resting further comprises not comingling, adding, or combining any additional ingredients to the fertigation composition during the period of time.

In another aspect, the fertigation composition is rested for a period of time ranging from 8 hrs to 36 hrs, including exemplary values of 9 hrs, 10 hrs, 11 hrs, 12 hrs, 13 hrs, 14 hrs, 15 hrs, 16 hrs, 17 hrs, 18 hrs, 19 hrs, 20 hrs, 21 hrs, 22 hrs, 23 hrs, 24 hrs, 25 hrs, 26 hrs, 27 hrs, 28 hrs, 29 hrs, 30 hrs, 31 hrs, 32 hrs, 33 hrs, 34 hrs, and 35 hrs. In a further aspect, the period of time can be derived from any two exemplary values. For example, the fertigation composition is rested for a period of time ranging from 9 hrs to 36 hrs. In another aspect, the fertigation composition can be rested overnight.

In one aspect, the fertigation composition is mixed in the fertigation tank. The mixing can take place using a static mixer, a dynamic mixer, manual stirring by hand, or shaking the fertigation tank. In one aspect, the flexible hose fixed inside the mixing tank allows for the stirring of the tank. One aspect of this stirring mechanism can be seen at FIG. 1.

In another aspect, the fertigation composition in the fertigation tank can be mixed for a period of time from 30 minutes to 90 minutes, including exemplary values of 35 min, 40 min, 45 min, 50 min, 55 min, 60 min, 65 min, 70 min, 75 min, 80 min, and 85 min. In further aspects, the time range can be derived from any two exemplary values. For example, the fertigation composition in the fertigation tank can be mixed for a period of time from 35 min to 90 min.

In one aspect, contacting the fertigation composition with soil further comprises: (a) dispensing the fertigation composition in dosages; and (b) charging the fertigation composition to an irrigation line.

In one aspect, the method comprises dispensing the fertigation composition in dosages. In a further aspect, the method comprises using a dosage pump that can be calibrated to send a specific quantity of fertigation composition from the mixing tank and pushing the fertigation composition into the irrigation line. The dosage pump can be calibrated by the end user, for example, a farmer or rancher, to ensure equal dosages per irrigation line. As used herein, an irrigation line is a transportation line used to transport water.

In one aspect, the method comprises charging the fertigation composition to an irrigation line. In a further aspect, the charging the fertigation composition comprises adding, loading, or inputting the fertigation composition into the irrigation line.

In one aspect, the method further comprises: (a) the fertilizer composition, wherein the fertilizer composition is present in an amount ranging from about 10 wt % to about 50 wt % based on the fertigation composition; (b) the fertilizer dissolving agent, wherein the fertilizer dissolving agent is present in an amount ranging from about 2 wt % to about 88 wt % based on the fertigation composition; and (c) water, wherein the water is present in an amount ranging from about 42 wt % to about 88 wt % based on the fertigation composition.

In accordance with the present invention, a fertilizer dissolving agent is a component of a composition used in a method for fertigation.

In one aspect, the fertilizer dissolving agent does not comprise hydrochloric acid or nitric acid, or a mixture thereof. In a further aspect, the fertilizer dissolving agent is substantially free of hydrochloric acid or nitric acid, or a mixture thereof. In one aspect, the fertilizer dissolving agent does not comprise hydrochloric acid. In a further aspect, the fertilizer dissolving agent is substantially free of hydrochloric acid. In one aspect, the fertilizer dissolving agent does not comprise phosphoric acid. In a further aspect, the fertilizer dissolving agent is substantially free of phosphoric acid.

In one aspect, a fertilizer dissolving agent can be present in an amount ranging from 1 wt % to 88 wt % of the total fertigation composition, including exemplary values of 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, and 85 wt %. The fertilizer dissolving agent can also be present in a range derived from any two of the exemplary weight percentages, such as, for example weight percentages ranging from 2.5 wt % to 3.0 wt %; from 3.5 wt % to 4.5 wt %; from 5.0 wt % to 6.5 wt %; and the like. The fertilizer dissolving agent can also be present in one of the exemplary examples. For example, a fertilizer dissolving agent can be present in 2.5 wt %, 3.0 wt %, 3.5 wt %, and the like.

The methods disclosed herein can utilize the compositions or apparatuses disclosed herein.

C. Fertigation Composition

A fertigation composition comprising: (a) a fertilizer composition, wherein the fertilizer composition is present in an amount ranging from about 10 wt % to about 50 wt % based on the fertigation composition; (b) a fertilizer dissolving agent, wherein the fertilizer dissolving agent is present in an amount ranging from about 2 wt % to about 88 wt % based on the fertigation composition; and (c) water, wherein the water is present in an amount ranging from about 42 wt % to about 88 wt % based on the fertigation composition.

1. Fertilizer Composition

A fertilizer composition is a composition comprising plant nutrients. A complete fertilizer composition comprises a blended combination of a nitrogen (N) source, a phosphorus (P) source, and a potassium (K) source. Any fertilizer composition with a nitrogen source, phosphorus source, and potassium source can be used in the invention. In one aspect, the fertilizer composition is insoluble in water prior to adding the fertilizer composition to the acidic mixture. In a further aspect, the fertilizer composition is partly insoluble in water prior to the adding the fertilizer composition to the acidic mixture. In a yet further aspect, the fertilizer composition is solid and/or granular.

Nitrogen, phosphorus, and potassium (NPK) content of complete fertilizer compositions can be expressed in derivative forms. For example, an NPK Grade 11-29-19 fertilizer composition means one hundred pounds of this fertilizer composition will have about eleven pounds of nitrogen in ammoniacal ($NH_4^+$) form, nitrate ($NO_3$) form, or a combination thereof, as nitrogen sources; about twenty-nine pounds of phosphorus as phosphorus pentoxide ($P_2O_5$) in phosphate (e.g., $H_2PO_4^-$, $HPO_4^{2-}$, or a combination thereof) form as phosphorus sources; and about nineteen pounds of potassium ($K^+$) as potassium oxide ($K_2O$). Further, for example, an NPK Grade 14-38-10 fertilizer composition means one hundred pounds of this fertilizer composition will have about fourteen pounds of nitrogen in ammoniacal ($NH_4^+$) form, nitrate ($NO_3$) form, or a combination thereof, as nitrogen sources; about thirty-eight pounds of phosphorus as phosphorus pentoxide ($P_2O_5$) in phosphate (e.g., $H_2PO_4^-$, $HPO_4^{2-}$, or a combination thereof) form as phosphorus sources; and about ten pounds of potassium ($K^+$) as potassium oxide ($K_2O$).

In one aspect, the fertilizer composition is present in an amount ranging from 10 wt % to 50 wt %, based on the fertigation composition, including exemplary values 15 wt %, 20 wt %, 25 wt %, 30 wt %, 35 wt %, 40 wt %, and 45 wt %. In further aspect, the range can be derived from any two exemplary values. For example, the fertilizer composition can be present in an amount ranging from 15 wt % to 45 wt % based on the fertigation composition.

2. Fertilizer Dissolving Agent

In accordance with the present invention, a fertilizer dissolving agent is a component of a fertilizer composition used in a method for fertigation.

Sulfuric acid, hydrochloric acid, nitric acid, or phosphoric acid are available from Aldrich Chemical Co., (Milwaukee, Wis., USA), Acros Organics (Morris Plains, N.J., USA), and the like.

The use of a fertilizer dissolving agent can allow the dissolving of the fertilizer composition. The fertilizer dissolving agent can also allow the dissolving of calcium ions and/or phosphate ions from the fertilizer composition. Without wishing to be bound by theory, phosphate ions can combine with the calcium ions to form calcium phosphate. The addition of a fertilizer dissolving agent can reduce the pH to a level at which phosphate ions are substantially converted to phosphoric acid, thereby limiting them from reacting with the calcium ions. Limiting the phosphate ions from reacting with the calcium ions helps to allow the fertilizer dissolving agent to dissolve the fertilizer composition.

In one aspect, the fertilizer dissolving agent does not comprise hydrochloric acid or nitric acid, or a mixture thereof. In a further aspect, the fertilizer dissolving agent is substantially free of hydrochloric acid or nitric acid, or a mixture thereof. In one aspect, the fertilizer dissolving agent does not comprise hydrochloric acid. In a further aspect, the fertilizer dissolving agent is substantially free of hydrochloric acid. In one aspect, the fertilizer dissolving agent does not comprise phosphoric acid. In a further aspect, the fertilizer dissolving agent is substantially free of phosphoric acid.

In one aspect, a fertilizer dissolving agent can be present in an amount ranging from 1 wt % to 12 wt % based on the total fertigation composition, including exemplary values of 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, and 10.0 wt %. The fertilizer dissolving agent can also be present in a range derived from any two of the exemplary weight percentages, such as, for example weight percentages ranging from 2.5 wt % to 3.0 wt %; from 3.5 wt % to 4.5 wt %; from 5.0 wt % to 6.5 wt %; and the like. The fertilizer dissolving agent can also be present in one of the exemplary examples. For example, a fertilizer dissolving agent can be present in 2.5 wt %, 3.0 wt %, 3.5 wt %, and the like.

Reference to weight percent of a fertilizer dissolving agent in a composition comprising water and fertilizer composition is expressed as the weight percent in relation to the total fertigation composition weight. Thus, a composition comprising 10%/90% fertilizer composition/water (w/v) further comprises a fertilizer dissolving agent as 5 wt % of the composition means a composition comprising 10%/5%/85% fertilizer composition/fertilizer dissolving agent/water (w/w/v).

3. Water

In accordance with the present invention, water is a component of a fertigation composition used in the fertigation method disclosed herein. In one aspect, the water is the medium with which a fertilizer composition and a fertilizer dissolving agent are mixed before the mixture is brought into contact with soil and, ultimately, the roots of plants. In another aspect, the water can be sourced terrestrially or atmospherically. In a further aspect, water sourced terrestrially includes, but is not limited to, groundwater taken from springs, wells, or aquifers; surface water taken from rivers, lakes, streams, and reservoirs; and/or treated wastewater, desalinated water, and drainage water. In a further aspect, water sourced atmospherically includes, but is not limited to, rainwater. Water can comprise impurities and/or contaminants, such as calcium ion, in amounts that vary depending on the conditions of the surroundings from which the water is sourced. The water obtained in this manner can also vary in pH, again depending on the conditions of the source environment.

In one aspect, water is present in an amount ranging from 35.0 wt % to 88.0 wt % of the total fertigation composition, including exemplary values of 38.0 wt %, 38.5 wt %, 39.0 wt %, 39.5 wt %, 40.0 wt %, 40.5 wt %, 41.0 wt %, 41.5 wt %, 42.0 wt %, 42.5 wt %, 49.5 wt %, 50.0 wt %, 50.5 wt %, 51.0 wt %, 51.5 wt %, 52.0 wt %, 52.5 wt %, 53.0 wt %, 53.5 wt %, 61.0 wt %, 62.0 wt %, 62.5 wt %, 63.0 wt %, 63.5 wt %, 64.0 wt %, 64.5 wt %, 65.0 wt %, 65.5 wt %, 51.0 wt %, 51.5 wt %, 52.0 wt %, 73.0 wt %, 73.5 wt %, 74.0 wt %, 74.5 wt %, 75.0 wt %, 75.5 wt %, 76.0 wt %, and 76.5 wt %. Water can also be present in a range derived from any two of the exemplary weight percentages, such as, for example, weight percentages ranging from 38.0 wt % to 38.5 wt %; from 39.0 wt % to 40.0 wt %; from 40.5 wt % to 42.0 wt %; and the like. Water can also be present in any one of the exemplary examples, such as, for example, 38.0 wt %, 38.5 wt %, 39 wt %, and the like.

In one aspect, water contains calcium ions in a concentration ranging from 50 parts per million (ppm) or milligrams per liter (i.e., mg/L) to greater than 1000 ppm, including exemplary ranges of less than 100 ppm to 300 ppm; 300 ppm to 600 ppm; 600 ppm to 1000 ppm; and greater than 1000 ppm. The calcium ions can also be present in any one of the exemplary examples, such as, for example, 100 ppm, 600 ppm, 1000 ppm, and the like. In one aspect, the calcium ion can be as present individually or as part of a compound.

Calcium ion concentration can be determined by means well known in the analytical chemical arts, such as, for example, on-site analysis or transportation of samples elsewhere for analysis. For example, calcium ion concentration can be determined by colorimetric titration using ethylenediaminetetraacetic acid (EDTA). Calcium ion content can also be determined using a kit such as, for example, a Calcium Assay Kit (Item No. 700550, Cayman Chemical Company, Ann Arbor, Mich., USA). Calcium ion can also be determined using flame atomic absorption spectroscopy.

In one aspect, water has a pH ranging from 5.0 to 10.0, with exemplary values of 5.5, 6.0, 6.5, 7.0; 7.0, 7.5; 7.5, 8.0, 8.5, 9.0, and 9.5. In another aspect, the pH can be in a range derived from two exemplary values. For example, the water has a pH ranging from 5.5 to 9.5.

The pH can be determined by analysis at the fertigation site or by taking samples elsewhere for analysis. For example, pH can be determined by inserting single-use, disposable pH test strips into water and comparing the color change on the strip to a corresponding pH test strip color chart or by potentiometric titration.

4. Soil

Soil is a thin layer of matter that covers much of Earth's surface and is made of many different substances including pulverized rock particles and decayed plant and animal matter in various combinations. As such, there are different types of soil and different ways to classify it. One classification system is based on the size of the particles that make up soil. Another system is based on soil color (e.g., red, black or yellow). Categorizing soil by particle size is most common in gardening and farming, as it is the most predictable way to determine how well plants will thrive in it. Soil categorized by particle size is labeled as sandy, silty, clay, loamy, peaty, or chalky. Applicability of soil type to plant and crop growth depends on factors such as needs of the plant or crop, soil porosity or facility with which water moves through it, moisture retention, pH, salinity, nutrient content, and heat capacity or heat absorptivity and retention.

5. Overview Fertigation Composition

In one aspect, the fertigation composition comprises a fertilizer composition comprising a NPK 11-29-19 Grade fertilizer composition, wherein the fertilizer composition is present in an amount of about 50 wt %, based on the total weight of the fertigation composition; a fertilizer dissolving agent comprising sulfuric acid, wherein the fertilizer dissolving agent is present in an amount of about 7.5 wt %, based on the total weight of the fertigation composition; and water in an amount of about 42.5 wt %, based on the total weight of the fertigation composition.

In another aspect, the fertigation composition comprises a fertilizer composition comprising a NPK 14-38-10 Grade fertilizer composition, wherein the fertilizer composition is present in an amount of about 50 wt %, based on the total weight of the fertigation composition; a fertilizer dissolving agent comprising sulfuric acid, wherein the fertilizer dissolving agent is present in an amount of about 10.0 wt %, based on the total weight of the fertigation composition; and water in an amount of about 40.0 wt %, based on the total weight of the fertigation composition.

In one aspect, the fertigation composition is prepared from mixtures comprising about 10%/90% NPK Grade 11-29-19 fertilizer composition/water (w/v) and [Ca2+] and with a pH of about 6.5 to about 7.0, those comprising less than about 100 ppm to about 300 ppm [Ca2+] further comprised sulfuric acid as about 2.5 weight percent of the fertigation composition; those comprising about 300 ppm to about 600 ppm [Ca2+] further comprised sulfuric acid as about 3.0 weight percent of the composition; those comprising about 600 ppm to about 1000 ppm [Ca2+] further comprised sulfuric acid as about 3.5 weight percent of the fertigation composition; and those comprising greater than about 1000 ppm [Ca2+] further comprised sulfuric acid as about 4.0 weight percent of the fertigation composition.

In one aspect, the fertigation composition is prepared from mixtures comprising about 10%/90% NPK Grade 11-29-19 fertilizer composition/water (w/v) and [Ca2+] and with a pH of about 7.0 to about 7.5, those comprising less than about 100 ppm to about 300 ppm [Ca2+] further comprised sulfuric acid as about 3.0 weight percent of the fertigation composition; those comprising about 300 ppm to about 600 ppm [Ca2+] further comprised sulfuric acid as about 3.5 weight percent of the fertigation composition; those comprising about 600 ppm to about 1000 ppm [Ca2+] further comprised sulfuric acid as about 3.5 to about 4.5 weight percent of the fertigation composition; and those comprising greater than about 1000 ppm [Ca2+] further comprised sulfuric acid as about 4.0 weight percent of the fertigation composition.

In one aspect, the fertigation composition is prepared from mixtures comprising about 10%/90% NPK Grade 11-29-19 fertilizer composition/water (w/v) and [Ca2+] and with a pH of about 7.5 to about 8.0, those comprising less than about 100 ppm to about 300 ppm [Ca2+] further comprised sulfuric acid as about 3.5 weight percent of the fertigation composition; those comprising about 300 ppm to about 600 ppm [Ca2+] further comprised sulfuric acid as about 3.5 weight percent of the fertigation composition; those comprising about 600 ppm to about 1000 ppm [Ca2+] further comprised sulfuric acid as about 3.5 weight percent of the fertigation composition; and those comprising greater than about 1000 ppm [Ca2+] further comprised sulfuric acid as about 4.0 weight percent of the fertigation composition.

In one aspect, the fertigation composition is prepared from mixtures comprising about 10%/90% NPK Grade 11-29-19 fertilizer composition/water (w/v) and [Ca2+] and with a pH of about 8.0 to about 8.5, those comprising less than about 100 ppm to about 300 ppm [Ca2+] further comprised sulfuric acid as about 3.5 weight percent of the fertigation composition; those comprising about 300 ppm to about 600 ppm [Ca2+] further comprised sulfuric acid as about 3.5 weight percent of the fertigation composition; those comprising about 600 ppm to about 1000 ppm [Ca2+] further comprised sulfuric acid as about 3.5 weight percent of the fertigation composition; and those comprising greater than about 1000 ppm [Ca2+] further comprised sulfuric acid as about 4.0 weight percent of the fertigation composition.

In one aspect, the fertigation composition is prepared from mixtures comprising about 10%/90% NPK Grade 11-29-19 fertilizer composition/water (w/v) and [Ca2+] and with a pH greater than about 8.5, those comprising less than about 100 ppm to about 300 ppm [Ca2+] further comprised sulfuric acid as about 3.5 weight percent of the fertigation composition; those comprising about 300 ppm to about 600 ppm [Ca2+] further comprised sulfuric acid as about 3.5 weight percent of the composition; those comprising about 600 ppm to about 1000 ppm [Ca2+] further comprised sulfuric acid as about 4.0 weight percent of the composition; and those comprising greater than about 1000 ppm [Ca2+] further comprised sulfuric acid as about 4.5 weight percent of the composition.

In one aspect, the fertigation composition is prepared from mixtures comprising about 20%/80% NPK Grade 11-29-19 fertilizer composition/water (w/v) and [Ca2+] and with a pH of about 6.5 to about 7.0, those comprising less than about 100 ppm to about 300 ppm [Ca2+] further comprised sulfuric acid as about 3.5 weight percent of the fertigation composition; those comprising 300 ppm to about 600 ppm [Ca2+] about further comprised sulfuric acid as about 4.0 weight percent of the fertigation composition; those comprising about 600 ppm to about 1000 ppm [Ca2+] further comprised sulfuric acid as about 4.0 weight percent of the fertigation composition; and those comprising greater than about 1000 ppm [Ca2+] further comprised sulfuric acid as about 5.0 to about 5.5 weight percent of the fertigation composition.

In one aspect, the fertigation composition is prepared from mixtures comprising about 20%/80% NPK Grade 11-29-19 fertilizer composition/water (w/v) and [Ca2+] and with a pH of about 7.0 to about 7.5, those comprising less than 300 ppm to about 300 ppm [Ca2+] further comprised sulfuric acid as about 4.0 weight percent of the fertigation composition; those comprising about 300 ppm to about 600 ppm [Ca2+] further comprised sulfuric acid as about 4.5 weight percent of the fertigation composition; those comprising about 600 ppm to about 1000 ppm [Ca2+] further comprised sulfuric acid as about 5.0 weight percent of the fertigation composition; and those comprising [Ca2+] greater than about 1000 ppm further comprised sulfuric acid as about 5.0 weight percent of the fertigation composition.

In one aspect, the fertigation composition is prepared from mixtures comprising about 20%/80% NPK Grade 11-29-19 fertilizer composition/water (w/v) and [Ca2+] and with a pH of about 7.5 to about 8.0, those comprising less than about 100 ppm to about 300 ppm [Ca2+] further comprised sulfuric acid as about 4.5 weight percent of the fertigation composition; those comprising about 300 ppm to about 600 ppm [Ca2+] further comprised sulfuric acid as about 4.5 weight percent of the fertigation composition; those comprising about 600 ppm to about 1000 ppm [Ca2+] further comprised sulfuric acid as about 4.5 weight percent of the fertigation composition; and those comprising greater than about 1000 ppm [Ca2+] further comprised sulfuric acid as about 5.0 to about 5.5 weight percent of the fertigation composition.

In one aspect, the fertigation composition is prepared from mixtures comprising about 20%/80% NPK Grade 11-29-19 fertilizer composition/water (w/v) and [Ca2+] and with a pH of about 8.0 to about 8.5, those comprising less than about 100 ppm to about 300 ppm [Ca2+] further comprised sulfuric acid as about 4.5 weight percent of the fertigation composition; those comprising about 300 ppm to about 600 ppm [Ca2+] further comprised sulfuric acid as about 4.5 weight percent of the fertigation composition; those comprising about 600 ppm to about 1000 ppm [Ca2+] further comprised sulfuric acid as about 4.5 weight percent of the fertigation composition; and those comprising greater than about 1000 ppm [Ca2+] further comprised sulfuric acid as about 5.0 weight percent of the fertigation composition.

In one aspect, the fertigation composition is prepared from mixtures comprising about 20%/80% NPK Grade 11-29-19 fertilizer composition/water (w/v) and [Ca2+] and with a pH greater than about 8.5, those comprising less than about 100 ppm to about 300 ppm [Ca2+] further comprised sulfuric acid as about 4.5 weight percent of the fertigation composition; those comprising about 300 ppm to about 600 ppm [Ca2+] further comprised sulfuric acid as 4.5 weight percent of the fertigation composition; those comprising about 600 ppm to about 1000 ppm [Ca2+] further comprised sulfuric acid as about 5.0 weight percent of the fertigation composition; and those comprising greater than about 1000 ppm [Ca2+] further comprised sulfuric acid as about 5.5 to about 6.0 weight percent of the fertigation composition.

In one aspect, the fertigation composition is prepared from mixtures comprising about 30%/70% NPK Grade 11-29-19 fertilizer composition/water (w/v) and [Ca2+] and with a pH of about 6.5 to about 7.0, those comprising less than about 100 ppm to about 300 ppm [Ca2+] further comprised sulfuric acid as about 4.5 weight percent of the fertigation composition; those comprising 300 ppm to about 600 ppm [Ca2+] about further comprised sulfuric acid as about 5.0 weight percent of the fertigation composition; those comprising about 600 ppm to about 1000 ppm [Ca2+] further comprised sulfuric acid as about 5.0 weight percent of the fertigation composition; and those comprising greater than about 1000 ppm [Ca2+] further comprised sulfuric acid as about 6.0 weight percent of the fertigation composition.

In one aspect, the fertigation composition is prepared from mixtures comprising about 30%/70% NPK Grade 11-29-19 fertilizer composition/water (w/v) and [Ca2+] and with a pH of about 7.0 to about 7.5, those comprising less than 300 ppm to about 300 ppm [Ca2+] further comprised sulfuric acid as about 5.0 weight percent of the fertigation composition; those comprising about 300 ppm to about 600 ppm [Ca2+] further comprised sulfuric acid as about 5.5 weight percent of the fertigation composition; those comprising about 600 ppm to about 1000 ppm [Ca2+] further comprised sulfuric acid as about 6.0 weight percent of the fertigation composition; and those comprising [Ca2+] greater than about 1000 ppm further comprised sulfuric acid as about 6.0 weight percent of the fertigation composition.

In one aspect, the fertigation composition is prepared from mixtures comprising about 30%/70% NPK Grade 11-29-19 fertilizer composition/water (w/v) and [Ca2+] and with a pH of about 7.5 to about 8.0, those comprising less than about 100 ppm to about 300 ppm [Ca2+] further comprised sulfuric acid as about 5.5 weight percent of the fertigation composition; those comprising about 300 ppm to about 600 ppm [Ca2+] further comprised sulfuric acid as about 5.5 weight percent of the fertigation composition; those comprising about 600 ppm to about 1000 ppm [Ca2+] further comprised sulfuric acid as about 5.5 weight percent of the fertigation composition; and those comprising greater than about 1000 ppm [Ca2+] further comprised sulfuric acid as about 6.0 weight percent of the fertigation composition.

In one aspect, the fertigation composition is prepared from mixtures comprising about 30%/70% NPK Grade 11-29-19 fertilizer composition/water (w/v) and [Ca2+] and with a pH of about 8.0 to about 8.5, those comprising less than about 100 ppm to about 300 ppm [Ca2+] further comprised sulfuric acid as about 5.5 weight percent of the fertigation composition; those comprising about 300 ppm to about 600 ppm [Ca2+] further comprised sulfuric acid as about 5.5 weight percent of the fertigation composition; those comprising about 600 ppm to about 1000 ppm [Ca2+] further comprised sulfuric acid as about 5.5 weight percent of the fertigation composition; and those comprising greater than about 1000 ppm [Ca2+] further comprised sulfuric acid as about 6.0 weight percent of the fertigation composition.

In one aspect, the fertigation composition is prepared from mixtures comprising about 30%/70% NPK Grade 11-29-19 fertilizer composition/water (w/v) and [Ca2+] and with a pH greater than about 8.5, those comprising less than about 100 ppm to about 300 ppm [Ca2+] further comprised sulfuric acid as about 5.5 weight percent of the fertigation composition; those comprising about 300 ppm to about 600 ppm [Ca2+] further comprised sulfuric acid as about 5.5 weight percent of the fertigation composition; those comprising about 600 ppm to about 1000 ppm [Ca2+] further comprised sulfuric acid as about 6.0 weight percent of the fertigation composition; and those comprising greater than about 1000 ppm [Ca2+] further comprised sulfuric acid as about 6.5 weight percent of the fertigation composition.

In one aspect, the fertigation composition is prepared from mixtures comprising about 40%/60% NPK Grade 11-29-19 fertilizer composition/water (w/v) and [Ca2+] and with a pH of about 6.5 to about 7.0, those comprising less than about 100 ppm to about 300 ppm [Ca2+] further comprised sulfuric acid as about 6.5 weight percent of the fertigation composition; those comprising 300 ppm to about 600 ppm [Ca2+] about further comprised sulfuric acid as about 7.0 weight percent of the fertigation composition; those comprising about 600 ppm to about 1000 ppm [Ca2+] further comprised sulfuric acid as about 7.0 weight percent of the fertigation composition; and those comprising greater than about 1000 ppm [Ca2+] further comprised sulfuric acid as about 8.0 weight percent of the fertigation composition.

In one aspect, the fertigation composition is prepared from mixtures comprising about 40%/60% NPK Grade 11-29-19 fertilizer composition/water (w/v) and [Ca2+] and with a pH of about 7.0 to about 7.5, those comprising less than 300 ppm to about 300 ppm [Ca2+] further comprised sulfuric acid as about 7.0 weight percent of the fertigation composition; those comprising about 300 ppm to about 600 ppm [Ca2+] further comprised sulfuric acid as about 7.5 weight percent of the fertigation composition; those comprising about 600 ppm to about 1000 ppm [Ca2+] further comprised sulfuric acid as about 8.0 weight percent of the fertigation composition; and those comprising [Ca2+] greater than about 1000 ppm further comprised sulfuric acid as about 8.0 weight percent of the fertigation composition.

In one aspect, the fertigation composition is prepared from mixtures comprising about 40%/60% NPK Grade 11-29-19 fertilizer composition/water (w/v) and [Ca2+] and with a pH of about 7.5 to about 8.0, those comprising less than about 100 ppm to about 300 ppm [Ca2+] further comprised sulfuric acid as about 7.5 weight percent of the fertigation composition; those comprising about 300 ppm to about 600 ppm [Ca2+] further comprised sulfuric acid as about 7.5 weight percent of the fertigation composition; those comprising about 600 ppm to about 1000 ppm [Ca2+] further comprised sulfuric acid as about 7.5 weight percent of the fertigation composition; and those comprising greater than about 1000 ppm [Ca2+] further comprised sulfuric acid as about 8.0 weight percent of the fertigation composition.

In one aspect, the fertigation composition is prepared from mixtures comprising about 40%/60% NPK Grade 11-29-19 fertilizer composition/water (w/v) and [Ca2+] and with a pH of about 8.0 to about 8.5, those comprising less than about 100 ppm to about 300 ppm [Ca2+] further comprised sulfuric acid as about 7.5 weight percent of the fertigation composition; those comprising about 300 ppm to about 600 ppm [Ca2+] further comprised sulfuric acid as about 7.5 weight percent of the fertigation composition; those comprising about 600 ppm to about 1000 ppm [Ca2+] further comprised sulfuric acid as about 7.5 weight percent of the fertigation composition; and those comprising greater than about 1000 ppm [Ca2+] further comprised sulfuric acid as about 8.0 weight percent of the fertigation composition.

In one aspect, the fertigation composition is prepared from mixtures comprising about 40%/60% NPK Grade 11-29-19 fertilizer composition/water (w/v) and [Ca2+] and with a pH greater than about 8.5, those comprising less than about 100 ppm to about 300 ppm [Ca2+] further comprised sulfuric acid as about 7.5 weight percent of the fertigation composition; those comprising about 300 ppm to about 600 ppm [Ca2+] further comprised sulfuric acid as about 7.5 weight percent of the fertigation composition; those comprising about 600 ppm to about 1000 ppm [Ca2+] further comprised sulfuric acid as about 8.0 weight percent of the fertigation composition; and those comprising greater than about 1000 ppm [Ca2+] further comprised sulfuric acid as about 8.5 weight percent of the fertigation composition.

In one aspect, the fertigation composition is prepared from mixtures comprising about 50%/50% NPK Grade 11-29-19 fertilizer composition/water (w/v) and [Ca2+] and with a pH of about 6.5 to about 7.0, those comprising less than about 100 ppm to about 300 ppm [Ca2+] further comprised sulfuric acid as about 7.5 weight percent of the fertigation composition; those comprising 300 ppm to about 600 ppm [Ca2+] about further comprised sulfuric acid as about 8.0 to about 8.5 weight percent of the fertigation composition; those comprising about 600 ppm to about 1000 ppm [Ca2+] further comprised sulfuric acid as about 8.5 weight percent of the fertigation composition; and those comprising greater than about 1000 ppm [Ca2+] further comprised sulfuric acid as about 9.0 weight percent of the fertigation composition.

In one aspect, the fertigation composition is prepared from mixtures comprising about 50%/50% NPK Grade 11-29-19 fertilizer composition/water (w/v) and [Ca2+] and with a pH of about 7.0 to about 7.5, those comprising less than 300 ppm to about 300 ppm [Ca2+] further comprised sulfuric acid as about 8.0 weight percent of the fertigation composition; those comprising about 300 ppm to about 600 ppm [Ca2+] further comprised sulfuric acid as about 8.5 weight percent of the fertigation composition; those comprising about 600 ppm to about 1000 ppm [Ca2+] further comprised sulfuric acid as about 9.0 weight percent of the fertigation composition; and those comprising [Ca2+] greater than about 1000 ppm further comprised sulfuric acid as about 9.0 to about 10.0 weight percent of the fertigation composition.

In one aspect, the fertigation composition is prepared from mixtures comprising about 50%/50% NPK Grade 11-29-19 fertilizer composition/water (w/v) and [Ca2+] and with a pH of about 7.5 to about 8.0, those comprising less than about 100 ppm to about 300 ppm [Ca2+] further comprised sulfuric acid as about 7.5 weight percent of the fertigation composition; those comprising about 300 ppm to about 600 ppm [Ca2+] further comprised sulfuric acid as 7.5 weight percent of the fertigation composition; those comprising about 600 ppm to about 1000 ppm [Ca2+] further comprised sulfuric acid as about 7.5 weight percent of the fertigation composition; and those comprising greater than about 1000 ppm [Ca2+] further comprised sulfuric acid as about 8.0 weight percent of the fertigation composition.

In one aspect, the fertigation composition is prepared from mixtures comprising about 50%/50% NPK Grade 11-29-19 fertilizer composition/water (w/v) and [Ca2+] and with a pH of about 8.0 to about 8.5, those comprising less than about 100 ppm to about 300 ppm [Ca2+] further comprised sulfuric acid as about 7.5 weight percent of the fertigation composition; those comprising about 300 ppm to about 600 ppm [Ca2+] further comprised sulfuric acid as 7.5 weight percent of the fertigation composition; those comprising about 600 ppm to about 1000 ppm [Ca2+] further comprised sulfuric acid as about 7.5 weight percent of the fertigation composition; and those comprising greater than about 1000 ppm [Ca2+] further comprised sulfuric acid as about 8.0 weight percent of the fertigation composition.

In one aspect, the fertigation composition is prepared from mixtures comprising about 50%/50% NPK Grade 11-29-19 fertilizer composition/water (w/v) and [Ca2+] and with a pH greater than about 8.5, those comprising less than about 100 ppm to about 300 ppm [Ca2+] further comprised sulfuric acid as about 7.5 weight percent of the fertigation composition; those comprising about 300 ppm to about 600 ppm [Ca2+] further comprised sulfuric acid as about 7.5 weight percent of the fertigation composition; those comprising about 600 ppm to about 1000 ppm [Ca2+] further comprised sulfuric acid as about 8.0 weight percent of the fertigation composition; and those comprising greater than about 1000 ppm [Ca2+] further comprised sulfuric acid as about 8.5 weight percent of the fertigation composition.

In one aspect, the fertigation composition is prepared from mixtures comprising about 10%/90% NPK Grade 14-38-10 fertilizer composition/water (w/v) and [Ca2+] and with a pH of about 6.5 to about 7.0, those comprising less than about 100 ppm to about 300 ppm [Ca2+] further comprised sulfuric acid as about 3.0 weight percent of the fertigation composition; those comprising about 300 ppm to about 600 ppm [Ca2+] further comprised sulfuric acid as about 3.5 weight percent of the fertigation composition; those comprising about 600 ppm to about 1000 ppm [Ca2+] further comprised sulfuric acid as about 3.5 weight percent of the fertigation composition; and those comprising greater than about 1000 ppm [Ca2+] further comprised sulfuric acid as about 4.0 weight percent of the fertigation composition.

In one aspect, the fertigation composition is prepared from mixtures comprising about 10%/90% NPK Grade 14-38-10 fertilizer composition/water (w/v) and [Ca2+] and with a pH of about 7.0 to about 7.5, those comprising less than about 100 ppm to about 300 ppm [Ca2+] further comprised sulfuric acid as about 3.0 weight percent of the fertigation composition; those comprising about 300 ppm to about 600 ppm [Ca2+] further comprised sulfuric acid as about 3.5 weight percent of the fertigation composition; those comprising about 600 ppm to about 1000 ppm [Ca2+] further comprised sulfuric acid as about 3.5 to about 4.5 weight percent of the fertigation composition; and those comprising greater than about 1000 ppm [Ca2+] further comprised sulfuric acid as about 4.0 weight percent of the fertigation composition.

In one aspect, the fertigation composition is prepared from mixtures comprising about 10%/90% NPK Grade 14-38-10 fertilizer composition/water (w/v) and [Ca2+] and with a pH of about 7.5 to about 8.0, those comprising less than about 100 ppm to about 300 ppm [Ca2+] further comprised sulfuric acid as about 3.5 weight percent of the fertigation composition; those comprising about 300 ppm to about 600 ppm [Ca2+] further comprised sulfuric acid as about 3.5 weight percent of the fertigation composition; those comprising about 600 ppm to about 1000 ppm [Ca2+] further comprised sulfuric acid as about 3.5 to about 4.0 weight percent of the fertigation composition; and those comprising greater than about 1000 ppm [Ca2+] further comprised sulfuric acid as about 4.0 weight percent of the fertigation composition.

In one aspect, the fertigation composition is prepared from mixtures comprising about 10%/90% NPK Grade 14-38-10 fertilizer composition/water (w/v) and [Ca2+] and with a pH of about 8.0 to about 8.5, those comprising less than about 100 ppm to about 300 ppm [Ca2+] further comprised sulfuric acid as about 3.5 weight percent of the fertigation composition; those comprising about 300 ppm to about 600 ppm [Ca2+] further comprised sulfuric acid as about 3.5 weight percent of the fertigation composition; those comprising about 600 ppm to about 1000 ppm [Ca2+] further comprised sulfuric acid as about 3.5 to about 4.0 weight percent of the fertigation composition; and those comprising greater than about 1000 ppm [Ca2+] further comprised sulfuric acid as about 4.0 weight percent of the fertigation composition.

In one aspect, the fertigation composition is prepared from mixtures comprising about 10%/90% NPK Grade 14-38-10 fertilizer composition/water (w/v) and [Ca2+] and with a pH greater than about 8.5, those comprising less than about 100 ppm to about 300 ppm [Ca2+] further comprised sulfuric acid as about 3.5 weight percent of the fertigation composition; those comprising about 300 ppm to about 600 ppm [Ca2+] further comprised sulfuric acid as about 4.0 weight percent of the fertigation composition; those comprising about 600 ppm to about 1000 ppm [Ca2+] further comprised sulfuric acid as about 4.0 to about 4.5 weight percent of the fertigation composition; and those comprising greater than about 1000 ppm [Ca2+] further comprised sulfuric acid as about 4.5 weight percent of the fertigation composition.

In one aspect, the fertigation composition is prepared from mixtures comprising about 20%/80% NPK Grade 14-38-10 fertilizer composition/water (w/v) and [Ca2+] and with a pH of about 6.5 to about 7.0, those comprising less than about 100 ppm to about 300 ppm [Ca2+] further comprised sulfuric acid as about 4.5 weight percent of the fertigation composition; those comprising 300 ppm to about 600 ppm [Ca2+] about further comprised sulfuric acid as about 4.5 weight percent of the fertigation composition; those comprising about 600 ppm to about 1000 ppm [Ca2+] further comprised sulfuric acid as about 5.0 weight percent of the fertigation composition; and those comprising greater than about 1000 ppm [Ca2+] further comprised sulfuric acid as about 5.5 weight percent of the fertigation composition.

In one aspect, the fertigation composition is prepared from mixtures comprising about 20%/80% NPK Grade 14-38-10 fertilizer composition/water (w/v) and [Ca2+] and with a pH of about 7.0 to about 7.5, those comprising less than 300 ppm to about 300 ppm [Ca2+] further comprised sulfuric acid as about 5.0 weight percent of the fertigation composition; those comprising about 300 ppm to about 600 ppm [Ca2+] further comprised sulfuric acid as about 5.5 weight percent of the fertigation composition; those comprising about 600 ppm to about 1000 ppm [Ca2+] further comprised sulfuric acid as about 6.0 weight percent of the fertigation composition; and those comprising [Ca2+] greater than about 1000 ppm further comprised sulfuric acid as about 6.5 weight percent of the fertigation composition.

In one aspect, the fertigation composition is prepared from mixtures comprising about 20%/80% NPK Grade 14-38-10 fertilizer composition/water (w/v) and [Ca2+] and with a pH of about 7.5 to about 8.0, those comprising less than about 100 ppm to about 300 ppm [Ca2+] further comprised sulfuric acid as 5.5 weight percent of the fertigation composition; those comprising about 300 ppm to about 600 ppm [Ca2+] further comprised sulfuric acid as 5.5 weight percent of the fertigation composition; those comprising about 600 ppm to about 1000 ppm [Ca2+] further comprised sulfuric acid as 6.0 weight percent of the fertigation composition; and those comprising greater than about 1000 ppm [Ca2+] further comprised sulfuric acid as about 6.5 to about 7.0 weight percent of the fertigation composition.

In one aspect, the fertigation composition is prepared from mixtures comprising about 20%/80% NPK Grade 14-38-10 fertilizer composition/water (w/v) and [Ca2+] and with a pH of about 8.0 to about 8.5, those comprising less than about 100 ppm to about 300 ppm [Ca2+] further comprised sulfuric acid as 5.0 weight percent of the fertigation composition; those comprising about 300 ppm to about 600 ppm [Ca2+] further comprised sulfuric acid as 5.5 weight percent of the fertigation composition; those comprising about 600 ppm to about 1000 ppm [Ca2+] further comprised sulfuric acid as 5.5 weight percent of the fertigation composition; and those comprising greater than about 1000 ppm [Ca2+] further comprised sulfuric acid as about 5.0 to about 6.0 weight percent of the fertigation composition.

In one aspect, the fertigation composition is prepared from mixtures comprising about 20%/80% NPK Grade 14-38-10 fertilizer composition/water (w/v) and [Ca2+] and with a pH greater than about 8.5, those comprising less than about 100 ppm to about 300 ppm [Ca2+] further comprised sulfuric acid as 5.0 weight percent of the fertigation composition; those comprising about 300 ppm to about 600 ppm [Ca2+] further comprised sulfuric acid as 4.5 weight percent of the fertigation composition; those comprising about 600 ppm to about 1000 ppm [Ca2+] further comprised sulfuric acid as about 5.0 weight percent of the fertigation composition; and those comprising greater than about 1000 ppm [Ca2+] further comprised sulfuric acid as about 5.5 to about 6.0 weight percent of the fertigation composition.

In one aspect, the fertigation composition is prepared from mixtures comprising about 30%/70% NPK Grade 14-38-10 fertilizer composition/water (w/v) and [Ca2+] and with a pH of about 6.5 to about 7.0, those comprising less than about 100 ppm to about 300 ppm [Ca2+] further comprised sulfuric acid as 5.5 weight percent of the fertigation composition; those comprising 300 ppm to about 600 ppm [Ca2+] about further comprised sulfuric acid as about 5.5 weight percent of the fertigation composition; those comprising about 600 ppm to about 1000 ppm [Ca2+] further comprised sulfuric acid as 6.5 weight percent of the fertigation composition; and those comprising greater than about 1000 ppm [Ca2+] further comprised sulfuric acid as about 7.0 weight percent of the fertigation composition.

In one aspect, the fertigation composition is prepared from mixtures comprising about 30%/70% NPK Grade 14-38-10 fertilizer composition/water (w/v) and [Ca2+] and with a pH of about 7.0 to about 7.5, those comprising less than about 300 ppm to about 300 ppm [Ca2+] further comprised sulfuric acid as about 7.0 weight percent of the fertigation composition; those comprising about 300 ppm to about 600 ppm [Ca2+] further comprised sulfuric acid as about 6.5 weight percent of the fertigation composition; those comprising about 600 ppm to about 1000 ppm [Ca2+] further comprised sulfuric acid as about 6.5 weight percent of the fertigation composition; and those comprising [Ca2+] greater than about 1000 ppm further comprised sulfuric acid as about 7.0 weight percent of the fertigation composition.

In one aspect, the fertigation composition is prepared from mixtures comprising about 30%/70% NPK Grade 14-38-10 fertilizer composition/water (w/v) and [Ca2+] and with a pH of about 7.5 to about 8.0, those comprising less than about 100 ppm to about 300 ppm [Ca2+] further comprised sulfuric acid as about 7.5 weight percent of the fertigation composition; those comprising about 300 ppm to about 600 ppm [Ca2+] further comprised sulfuric acid as about 8.0 weight percent of the fertigation composition; those comprising about 600 ppm to about 1000 ppm [Ca2+] further comprised sulfuric acid as about 8.5 weight percent of the fertigation composition; and those comprising greater than about 1000 ppm [Ca2+] further comprised sulfuric acid as about 9.0 weight percent of the fertigation composition.

In one aspect, the fertigation composition is prepared from mixtures comprising about 30%/70% NPK Grade 14-38-10 fertilizer composition/water (w/v) and [Ca2+] and with a pH of about 8.0 to about 8.5, those comprising less than about 100 ppm to about 300 ppm [Ca2+] further comprised sulfuric acid as about 7.0 weight percent of the fertigation composition; those comprising about 300 ppm to about 600 ppm [Ca2+] further comprised sulfuric acid as about 7.5 weight percent of the fertigation composition; those comprising about 600 ppm to about 1000 ppm [Ca2+] further comprised sulfuric acid as about 7.5 weight percent of the fertigation composition; and those comprising greater than about 1000 ppm [Ca2+] further comprised sulfuric acid as about 7.5 weight percent of the fertigation composition.

In one aspect, the fertigation composition is prepared from mixtures comprising about 30%/70% NPK Grade 14-38-10 fertilizer composition/water (w/v) and [Ca2+] and with a pH greater than about 8.5, those comprising less than about 100 ppm to about 300 ppm [Ca2+] further comprised sulfuric acid as about 7.0 weight percent of the fertigation composition; those comprising about 300 ppm to about 600 ppm [Ca2+] further comprised sulfuric acid as about 7.5 weight percent of the fertigation composition; those comprising about 600 ppm to about 1000 ppm [Ca2+] further comprised sulfuric acid as about 7.5 to about 8.0 weight percent of the fertigation composition; and those comprising greater than about 1000 ppm [Ca2+] further comprised sulfuric acid as about 8.0 weight percent of the fertigation composition.

In one aspect, the fertigation composition is prepared from mixtures comprising about 40%/60% NPK Grade 14-38-10 fertilizer composition/water (w/v) and [Ca2+] and with a pH of about 6.5 to about 7.0, those comprising less than about 100 ppm to about 300 ppm [Ca2+] further comprised sulfuric acid as about 8.5 weight percent of the fertigation composition; those comprising 300 ppm to about 600 ppm [Ca2+] about further comprised sulfuric acid as about 8.5 weight percent of the fertigation composition; those comprising about 600 ppm to about 1000 ppm [Ca2+] further comprised sulfuric acid as about 8.0 to about 9.0 weight percent of the fertigation composition; and those comprising greater than about 1000 ppm [Ca2+] further comprised sulfuric acid as about 9.5 weight percent of the fertigation composition.

In one aspect, the fertigation composition is prepared from mixtures comprising about 40%/60% NPK Grade 14-38-10 fertilizer composition/water (w/v) and [Ca2+] and with a pH of about 7.0 to about 7.5, those comprising less than 300 ppm to about 300 ppm [Ca2+] further comprised sulfuric acid as about 8.5 weight percent of the fertigation composition; those comprising about 300 ppm to about 600 ppm [Ca2+] further comprised sulfuric acid as about 8.5 weight percent of the fertigation composition; those comprising about 600 ppm to about 1000 ppm [Ca2+] further comprised sulfuric acid as about 8.5 weight percent of the fertigation composition; and those comprising [Ca2+] greater than about 1000 ppm further comprised sulfuric acid as about 9.0 weight percent of the fertigation composition.

In one aspect, the fertigation composition is prepared from mixtures comprising about 40%/60% NPK Grade 14-38-10 fertilizer composition/water (w/v) and [Ca2+] and with a pH of about 7.5 to about 8.0, those comprising less than about 100 ppm to about 300 ppm [Ca2+] further comprised sulfuric acid as about 9.0 weight percent of the fertigation composition; those comprising about 300 ppm to about 600 ppm [Ca2+] further comprised sulfuric acid as about 9.5 weight percent of the fertigation composition; those comprising about 600 ppm to about 1000 ppm [Ca2+] further comprised sulfuric acid as about 9.5 weight percent of the fertigation composition; and those comprising greater than about 1000 ppm [Ca2+] further comprised sulfuric acid as about 10.0 to about 10.5 weight percent of the fertigation composition.

In one aspect, the fertigation composition is prepared from mixtures comprising about 40%/60% NPK Grade 14-38-10 fertilizer composition/water (w/v) and [Ca2+] and with a pH of about 8.0 to about 8.5, those comprising less than about 100 ppm to about 300 ppm [Ca2+] further comprised sulfuric acid as about 9.0 weight percent of the fertigation composition; those comprising about 300 ppm to about 600 ppm [Ca2+] further comprised sulfuric acid as about 9.5 weight percent of the fertigation composition; those comprising about 600 ppm to about 1000 ppm [Ca2+] further comprised sulfuric acid as about 9.5 weight percent of the fertigation composition; and those comprising greater than about 1000 ppm [Ca2+] further comprised sulfuric acid as about 9.5 to about 10.0 weight percent of the fertigation composition.

In one aspect, the fertigation composition is prepared from mixtures comprising about 40%/60% NPK Grade 14-38-10 fertilizer composition/water (w/v) and [Ca2+] and with a pH greater than about 8.5, those comprising less than about 100 ppm to about 300 ppm [Ca2+] further comprised sulfuric acid as about 9.0 weight percent of the fertigation composition; those comprising about 300 ppm to about 600 ppm [Ca2+] further comprised sulfuric acid as about 9.5 weight percent of the fertigation composition; those comprising about 600 ppm to about 1000 ppm [Ca2+] further comprised sulfuric acid as about 9.0 to about 10.5 weight percent of the fertigation composition; and those comprising greater than about 1000 ppm [Ca2+] further comprised sulfuric acid as about 9.5 to about 10.0 weight percent of the fertigation composition.

In one aspect, the fertigation composition is prepared from mixtures comprising about 50%/50% NPK Grade 14-38-10 fertilizer composition/water (w/v) and [Ca2+] and with a pH of about 6.5 to about 7.0, those comprising less than about 100 ppm to about 300 ppm [Ca2+] further comprised sulfuric acid as about 10.0 weight percent of the fertigation composition; those comprising 300 ppm to about 600 ppm [Ca2+] about further comprised sulfuric acid as about 10.0 weight percent of the fertigation composition; those comprising about 600 ppm to about 1000 ppm [Ca2+] further comprised sulfuric acid as about 10.0 to about 10.5 weight percent of the fertigation composition; and those comprising greater than about 1000 ppm [Ca2+] further comprised sulfuric acid as about 10.5 to about 11.0 weight percent of the fertigation composition.

In one aspect, the fertigation composition is prepared from mixtures comprising about 50%/50% NPK Grade 14-38-10 fertilizer composition/water (w/v) and [Ca2+] and with a pH of about 7.0 to about 7.5, those comprising less than 300 ppm to about 300 ppm [Ca2+] further comprised sulfuric acid as about 10.0 weight percent of the fertigation composition; those comprising about 300 ppm to about 600 ppm [Ca2+] further comprised sulfuric acid as about 10.0 weight percent of the fertigation composition; those comprising about 600 ppm to about 1000 ppm [Ca2+] further comprised sulfuric acid as about 10.5 weight percent of the fertigation composition; and those comprising [Ca2+] greater than about 1000 ppm further comprised sulfuric acid as about 11.0 weight percent of the fertigation composition.

In one aspect, the fertigation composition is prepared from mixtures comprising about 50%/50% NPK Grade 14-38-10 fertilizer composition/water (w/v) and [Ca2+] and with a pH of about 7.5 to about 8.0, those comprising less than about 100 ppm to about 300 ppm [Ca2+] further comprised sulfuric acid as about 7.5 weight percent of the fertigation composition; those comprising about 300 ppm to about 600 ppm [Ca2+] further comprised sulfuric acid as about 7.5 weight percent of the fertigation composition; those comprising about 600 ppm to about 1000 ppm [Ca2+] further comprised sulfuric acid as about 7.5 weight percent of the fertigation composition; and those comprising greater than about 1000 ppm [Ca2+] further comprised sulfuric acid as about 8.0 weight percent of the fertigation composition.

In one aspect, the fertigation composition is prepared from mixtures comprising about 50%/50% NPK Grade 14-38-10 fertilizer composition/water (w/v) and [Ca2+] and with a pH of about 8.0 to about 8.5, those comprising less than about 100 ppm to about 300 ppm [Ca2+] further comprised sulfuric acid as about 11.0 weight percent of the fertigation composition; those comprising about 300 ppm to about 600 ppm [Ca2+] further comprised sulfuric acid as about 11.5 weight percent of the fertigation composition; those comprising about 600 ppm to about 1000 ppm [Ca2+] further comprised sulfuric acid as about 12.0 weight percent of the fertigation composition; and those comprising greater than about 1000 ppm [Ca2+] further comprised sulfuric acid as about 12.0 weight percent of the fertigation composition.

In one aspect, the fertigation composition is prepared from mixtures comprising about 50%/50% NPK Grade 14-38-10 fertilizer composition/water (w/v) and [Ca2+] and with a pH greater than about 8.5, those comprising less than about 100 ppm to about 300 ppm [Ca2+] further comprised sulfuric acid as about 11.0 weight percent of the fertigation composition; those comprising about 300 ppm to about 600 ppm [Ca2+] further comprised sulfuric acid as about 11.5 weight percent of the fertigation composition; those comprising about 600 ppm to about 1000 ppm [Ca2+] further comprised sulfuric acid as about 11.5 weight percent of the fertigation composition; and those comprising greater than about 1000 ppm [Ca2+] further comprised sulfuric acid as about 12.0 weight percent of the fertigation composition.

Disclosed are materials, compositions, and components which can be used for, can be used in conjunction with, can be used in preparation for, or are products of the disclosed methods and compositions. These and other materials are disclosed herein, and it is understood that while specific reference of each various individual and collective combination and permutation of these methods and compositions may not be explicitly disclosed, each is specifically contemplated and described herein.

The compositions disclosed herein can utilize the methods, systems, or apparatuses disclosed herein.

D. Fertigation System

A fertigation system comprising: (a) a fertigation storage-mixing tank having an inlet for receiving one or more fertigation components from a source; (b) a fertigation pump having an inlet in selective communication with the fertigation storage-mixing tank and having a pump discharge outlet; (c) a recirculation loop in selective communication with said pump discharge outlet and having a terminal recirculation loop discharge end located within said storage-mixing tank and defining a recirculation discharge inlet; and (d) a fertigation feed line in selective communication with said pump discharge outlet and having a terminal fertigation discharge end in communication with a downstream irrigation system; wherein the system is selectively operable in a first and second operable configuration, wherein, in the first operable configuration, the fertigation pump inlet is in fluid communication with the fertigation storage mixing tank; the recirculation loop is in fluid communication the pump discharge outlet; and the fertigation feed line is not in fluid communication with the pump discharge outlet, such that the system is configured to recirculate one or more fertigation components within the fertigation storage-mixing tank; and wherein, in the second operable configuration, the fertigation pump inlet is in fluid communication with the storage mixing tank; the recirculation loop is not in fluid communication with the pump discharge outlet; and the fertigation feed line is in fluid communication with the pump discharge outlet, such that the system is configured to feed a dosage of one or more fertigation components to the downstream irrigation system.

In FIG. 1, the source as an inlet of water is connected by line 1 to the fertigation tank by valve 10. When valve 10 is open, the water flows into the fertigation tank through the end of line 1, which is a flexible tube. At the bottom of the fertigation tank is the solid fertilizer composition. The fertilizer dissolving agent can be added before or after the water to form the acidic mixture of water and fertilizer dissolving agent. To mix the fertigation tank, valve 11 is opened, valve 14 is closed, and valve 12 and/or valve 13 are opened. The pump then is turned on and the water, fertilizer composition, fertigation composition, and/or fertilizer dissolving agent circulate through line 2 to re-enter the fertigation tank at the top. As the water, fertilizer composition, fertigation composition, and/or fertilizer dissolving agent mix, the remaining fertilizer composition dissolves. When the desired amount of fertilizer composition has dissolved, valve 11 is closed and valve 14 is opened. The pump then pumps the fertigation composition from the fertigation tank into line 3 to the irrigation line 4. The fertigation tank can be drained through valve 15.

In one aspect, the fertilizer equipment comprises an irrigation tank or a fertigation tank. In a further aspect, the fertigation tank can be portable or can be stationary. In another aspect, the fertilizer equipment comprises polyethylene, plastic, or any suitable chemical resistant material. In one aspect, fertilizer equipment comprises a chemical resistant material or an anticorrosive material, or a combination thereof. In another aspect, the chemical resistant material or the anticorrosive material further comprises stainless steel or polypropylene, or a mixture thereof. In a further aspect, the fertigation storage-mixing tank comprises a chemical resistant material or an anticorrosive material, or a combination thereof.

In accordance with the present invention, disclosed herein is fertigation equipment comprising an irrigation tank or a storage-mixing tank, a fertigation pump or dosage pump having an inlet in selective communication with the storage mixing tank and a pump discharge outlet; a recirculation loop in selective communication with the pump discharge outlet and a terminal recirculation loop discharge end located within the storage-mixing tank and defining a recirculation discharge inlet; and a fertigation feed line in selective communication with the pump discharge outlet and having a terminal fertigation discharge end in communication with a downstream irrigation system, wherein the fertigation equipment is selectively operable in a first operable configuration and a second operable configuration.

In another aspect, the fertigation pump comprises a chemical resistant material or an anticorrosive material, or a combination thereof. In a further aspect, the fertigation pump further comprises an injector having an inlet for receiving one or more components from a source and an outlet injector.

Figure 2:
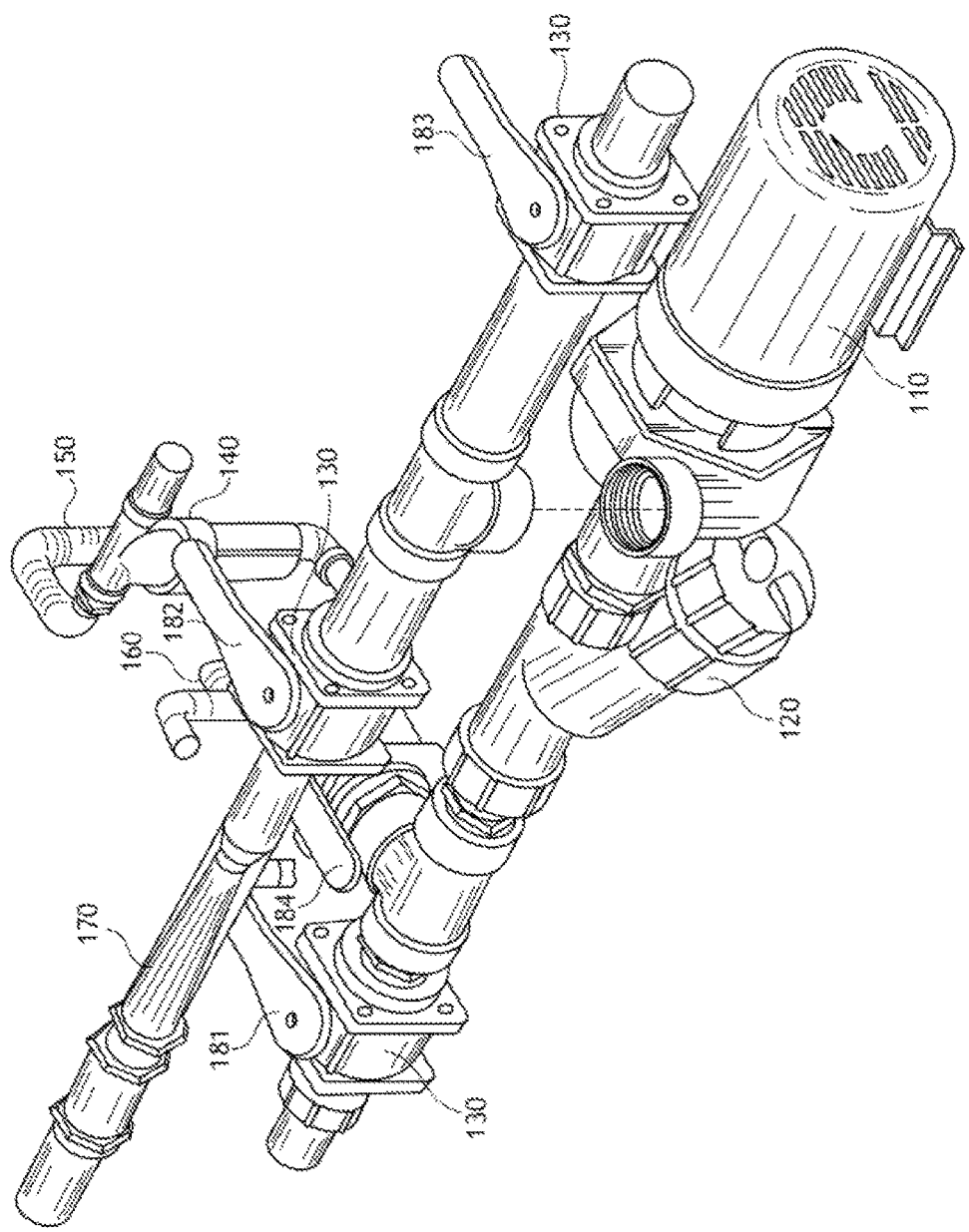
FIG. 2 shows a fertigation pump of one embodiment of the present invention.

One aspect of the fertigation pump can be seen in FIG. 2. In one aspect, the fertigation pump allows for the dose calibration of the fertigation composition and/or of the fertilizer dissolving agent.

In one aspect, the FIG. 2 shows an injection pump 110, a motor pump 120, strainer 130, valves 140, a filter 150, flow-meter 160, and a metering valve injector 170. The specific valves 140 have numbers on the switch itself ranging from 180, 181, 182, and 183 to designate the specific valve. As such, the specific valve is designated by the number on the switch itself. The filter 150 filters the water from the water source.

In FIG. 2, valve 183 discharges the water to the fertigation tank, valve 182 discharges the fertigation tank content to the irrigation line, valve 181 is the inlet of the fertigation tank to the pump, and valve 184 is the inlet of the raw water from the water source.

In one aspect, the procedure for using the fertigation pump is first to fill the fertigation tank with water from the main source, open valve 183 and valve 184 while valve 181 and valve 182 stay closed. Then, the water will flow from the water source or the water well to fill the tank through valve 183. Second, to operate the tank's internal circulation, valve 182 and valve 184 are closed and valve 181 and valve 183 are opened. Third, to charge the tank mixture to an irrigation line, valve 183 and valve 184 are closed and valve 181 and 182 are opened.

In one aspect, the fertigation pump is an inexpensive and easy to use apparatus to allow the farmer to perform the method.

In one aspect, the injector is capable of obtaining an injection rate up to 160 GPM. In another aspect, the injector is capable of obtaining an injection rate ranging from 90 GPM to 160 GPM, including exemplary values of 100 GPM, 105 GPM, 110 GPM, 115 GPM, 120 GPM, 125 GPM, 130 GPM, 135 GPM, 140 GPM, 145 GPM, 150 GPM, and 155 GPM. In a further aspect, the rate can be in a range derived from any two exemplary values. For example, the injection rate can range from 95 GPM to 155 GPM.

In one aspect, the fertigation composition comprises a fertilizer composition comprising a NPK 11-29-19 Grade fertilizer composition, a fertilizer dissolving agent comprising sulfuric acid; and water. In another aspect, the fertigation composition comprises a calcium ion, wherein the calcium ion content is about 300 ppm. In a further aspect, the fertigation composition comprises a fertilizer composition comprising NPK 14-38-10 Grade fertilizer composition; a fertilizer dissolving agent comprising sulfuric acid; and water.

In one aspect, to make a solid NPK granular fertilizer composition soluble in irrigation water at atmospheric pressure and ambient temperature, and to be applicable for use in a fertigation system, the irrigation water was fed into a mixing tank through a feed line from a water supply. The fertilizer dissolving agent was added to the water in the fertigation tank, according to the water pH and calcium ion content reading. A pump was used to mix the fertilizer dissolving agent with the water in the fertigation tank by recirculation. After about 10 to 15 minutes, a granular fertilizer composition was added to the mixing tank. The mixture was then left for at least 8 hours without agitation, after which the pump was used as a stirrer by circulating the mixture inside the tank. After half an hour had elapsed, the fertigation process was conducted though the main fertigation system. The pump was used as an injector of fertilizer composition to the irrigation line by the sucking of fertilizer composition in dosages from fertigation tank to the irrigation line.

In one aspect, the source comprises a water source. In a further aspect, the source comprises a well or a water supply. In another aspect, the water can be sourced terrestrially or atmospherically. In a further aspect, water sourced terrestrially includes, but is not limited to, groundwater taken from springs, wells, or aquifers; surface water taken from rivers, lakes, streams, and reservoirs; and/or treated wastewater, desalinated water, and drainage water. In a further aspect, water sourced atmospherically includes, but is not limited to, rainwater. Water can comprise impurities and/or contaminants, such as calcium ion, in amounts that vary depending on the conditions of the surroundings from which the water is sourced. The water obtained in this manner can also vary in pH, again depending on the conditions of the source environment.

In one aspect, the water source can be from an irrigation tank or a fertigation storage-mixing tank. An irrigation tank, for example, is a stationary, artificial reservoir of any size with a natural or artificial water source included as part of a structure. Irrigation tanks can be used to harvest and preserve rainfall and water from streams and rivers for later use, primarily for agriculture and drinking water. Such tanks are useful in regions without perennial rainfall where water supply replenishment is dependent on alternating cycles of dry and rainy seasons. A storage-mixing tank can be a portable reservoir that can be transported to the fertigation site. The fertigation tank is made of chemical-resistant plastic, such as, for example polyethylene and the like. The fertigation tank can be transported to a farm and connected to a water feed from the farm's well or water supply. In a further aspect, the fertigation tank functioned as a storage-mixing tank with an inlet for receiving one or more fertigation components and in which irrigation water, NPK-grade fertilizer composition, and a fertilizer dissolving agent can be mixed. Mixing was achieved by side-to-side swirling action of an inlet hose pipe long enough to curl at the bottom of the mixing tank, thereby avoiding use of complicated agitator assembly.

In one aspect, a suitable fertigation tank size can be in a range derived from 1000 L to 5000 L, including exemplary values of 1500 L, 2000 L, 2500 L, 3000 L, 3500 L, 4000 L, and 4500 L. In a further aspect, the range can be derived from any two exemplary values. For example, a suitable fertigation tank size can be in a range derived from 1500 L to 4500 L.

In one aspect, the fertilization composition dosage pump was used as both a stirrer to mix water and a fertilizer dissolving agent in close circulation and a dosage-wise injector of fertilizer composition into an irrigation main line by sucking the mixture from the storage-mixing tank to the irrigation line. For example, when water was forced into the mixing tank, the resultant swirling motion assisted dissolution of the NPK granules and provided efficacious granule dissolution. This method was more economically feasible than other methods that use highly soluble and expensive liquid fertilizers.

In one aspect, in the first operable configuration, the fertigation pump inlet was in fluid communication with the fertigation storage mixing tank; the recirculation loop was in fluid communication with the pump discharge outlet; and the fertigation composition feed line was not in fluid communication with the pump discharge outlet, such that the fertigation system was configured to recirculate one or more fertigation compositions within the fertigation storage-mixing tank.

In one aspect, in the second operable configuration, the fertigation pump inlet was in fluid communication with the storage mixing tank; the recirculation loop was not in fluid communication with the pump discharge outlet; and the fertigation feed line was in fluid communication with the pump discharge outlet, such that the system was configured to feed a dosage of one or more fertigation compositions to the downstream irrigation line.

In one aspect, control over uniform fertilizer distribution and fertilizer composition amount delivered was achieved by dividing the fertigation tank capacity by the number of hours required to complete one irrigation revolution. The fertilizer quantity, in gallons or liters per hour, equaled the fertigation tank capacity, in gallon or liter per unit of time, of one complete revolution (in gallon or liter/hour). A metering valve (flow meter) was used to adjust the flow rate according to the following relationship:

$$\text{amount of fertilizer composition by gallon (or liter)/minute} = \frac{\text{quantity of fertilizer composition by gallon (or liter)}}{\text{(hours} + 60)}$$

The apparatus disclosed herein can utilize the compositions or methods disclosed herein.

E. Aspects

The disclosed compositions and methods include at least the following aspects.

Aspect 1: A method for fertigation comprising: (a) providing an acidic mixture of water and an acidic fertilizer dissolving agent; (b) contacting the acidic mixture with a fertilizer composition in fertigation equipment to dissolve the fertilizer composition and to form a fertigation composition; and (c) contacting the fertigation composition with soil.

Aspect 2: The method for fertigation of aspect 1, further comprising cleaning the fertigation composition from the fertigation equipment.

Aspect 3: The method for fertigation of any of aspects 1 and 2, wherein providing the acidic mixture further comprises:
(a) filling a fertigation tank with water to a required level;
(b) checking the pH and the calcium content of the water to determine when a desired pH and calcium content has been reached;
(c) adding a fertilizer dissolving agent comprising sulfuric acid or phosphoric acid, or a mixture thereof; and
(d) repeating steps b and c, as necessary, until the desired pH and calcium content has been reached.

Aspect 4: The method for fertigation of any of aspects 1-3, wherein contacting the acidic mixture with a fertilizer composition further comprises:
(a) resting the fertigation composition for a period of time ranging from about 8 hrs to about 36 hrs; and
(b) mixing the fertigation composition in the fertigation tank for a period of time ranging from about 30 minutes to about 90 minutes.

Aspect 5: The method for fertigation of any of aspects 1-4, wherein contacting the fertigation composition with soil further comprises:
(a) dispensing the fertigation composition in dosages; and
(b) charging the fertigation composition to an irrigation line.

Aspect 6: The method for fertigation of any of aspects 2-5, wherein cleaning the fertigation composition further comprises:
(a) flushing an irrigation line with water; and
(b) sending the fertigation composition to an irrigation line.

Aspect 7: The method for fertigation of any of aspects 1-6, wherein
(a) the fertilizer composition is present in an amount ranging from about 10 wt % to about 50 wt %, based on the fertigation composition;
(b) the fertilizer dissolving agent is present in an amount ranging from about 2 wt % to about 88 wt %, based on the fertigation composition; and
(c) water is present in an amount ranging from about 2 wt % to about 88 wt %, based on the fertigation composition.

Aspect 8: The method for fertigation of any of aspects 1-7, wherein the fertilizer dissolving agent comprises hydrochloric acid, nitric acid, phosphoric acid, or sulfuric acid or a combination thereof.

Aspect 9: The method for fertigation of any of aspects 1-8, wherein the fertilizer dissolving agent comprises phosphoric acid, or sulfuric acid or a combination thereof.

Aspect 10. The method for fertigation of any of aspects 1-9, wherein the fertilizer dissolving agent comprises sulfuric acid.

Aspect 11. The method for fertigation of any of aspects 1-10, wherein the fertilizer dissolving agent does not comprise hydrochloric acid or nitric acid.

Aspect 12. The method for fertigation of any of aspects 1-11, wherein the fertigation equipment comprises an irrigation tank or a portable fertigation tank.

Aspect 13. A fertigation composition comprising:
(a) a fertilizer composition, wherein the fertilizer composition is present in an amount ranging from about 10 wt % to about 50 wt %, based on the fertigation composition;
(b) a fertilizer dissolving agent comprising sulfuric acid or phosphoric acid, or a mixture thereof, wherein the fertilizer dissolving agent is present in an amount ranging from about 2 wt % to about 88 wt %, based on the fertigation composition; and (c) water; wherein the water is present in an amount ranging from about 2 wt % to about 88 wt %, based on the fertigation composition.

Aspect 14. The fertigation composition of aspect 13, wherein the fertilizer dissolving agent does not comprise hydrochloric acid or nitric acid.

Aspect 15. The fertigation composition of any of aspect 13-14, wherein the fertigation composition comprises a fertilizer composition comprising a NPK 11-29-19 Grade fertilizer, wherein the fertilizer composition is present in an amount of about 35 wt % to 60 wt %, based on the total weight of the fertigation composition; a fertilizer dissolving agent comprising sulfuric acid, wherein the fertilizer dissolving agent is present in an amount of about 4.5 wt % to 7.5 wt %, based on the total weight of the fertigation composition; and water in an amount of about 30 wt % to 50 wt %, based on the total weight of the fertigation composition.

Aspect 16. The fertigation composition of any one of aspects 13-15, wherein the fertigation composition comprises a fertilizer composition comprising a NPK 14-38-10 Grade fertilizer composition, wherein the fertilizer composition is present in an amount of about 30 wt % to 60 wt %, based on the total weight of the fertigation composition; a fertilizer dissolving agent comprising sulfuric acid, wherein the fertilizer dissolving agent is present in an amount of about 4 wt % to 12 wt %, based on the total weight of the fertigation composition; and water in an amount of about 30 wt % to 50 wt %, based on the total weight of the fertigation composition.

Aspect 17: The fertigation composition of any of aspects 13-16, wherein the fertilizer dissolving agent comprises hydrochloric acid, nitric acid, or phosphoric acid, or a mixture thereof.

Aspect 18: The fertigation composition of any of aspects 13-17, wherein the fertilizer dissolving agent comprises sulfuric acid.

Aspect 19. A fertigation system comprising:

(a) a fertigation storage-mixing tank having an inlet for receiving one or more fertigation components from a source;

(b) a fertigation pump having an inlet in selective communication with the fertigation storage-mixing tank and having a pump discharge outlet;

(c) a recirculation loop in selective communication with said pump discharge outlet and having a terminal recirculation loop discharge end located within said storage-mixing tank and defining a recirculation discharge inlet; and (d) a fertigation feed line in selective communication with said pump discharge outlet and having a terminal fertigation discharge end in communication with a downstream irrigation system;

wherein the system is selectively operable in a first and second operable configuration, wherein, in the first operable configuration, the fertigation pump inlet is in fluid communication with the fertigation storage mixing tank; the recirculation loop is in fluid communication with the pump discharge outlet; and the fertigation feed line is not in fluid communication with the pump discharge outlet, such that the system is configured to recirculate one or more fertigation components within the fertigation storage-mixing tank; and wherein, in the second operable configuration, the fertigation pump inlet is in fluid communication with the storage mixing tank; the recirculation loop is not in fluid communication with the pump discharge outlet; and the fertigation feed line is in fluid communication with the pump discharge outlet, such that the system is configured to feed a dosage of one or more fertigation components to the downstream irrigation system.

Aspect 20. The fertigation system of aspect 19, wherein the fertigation storage-mixing tank comprises a chemical resistant material or an anticorrosive material, or a combination thereof.

Aspect 21. The fertigation system of any of aspects 19 and 20, wherein the chemical resistant material or the anticorrosive material comprises polyethylene, or plastic, or a mixture thereof.

Aspect 22. The fertigation system of any of aspects 19-21, wherein the source comprises a well or a water supply.

Aspect 23. The fertigation system of any of aspects 19-22, wherein the fertigation pump comprises a chemical resistant material or an anticorrosive material, or a combination thereof.

Aspect 24. The fertigation system of any of aspects 19-23, wherein the chemical resistant material or the anticorrosive material comprises stainless steel, or polypropylene, or a mixture thereof.

Aspect 25. The fertigation system of any of aspects 19-24, wherein the fertigation pump further comprises an injector having an inlet for receiving one or more components from a source and an outlet injector.

Aspect 26. The fertigation system of any of aspects 19-25, wherein the injector is capable of obtaining an injection rate up to 160 GPM.

Aspect 27. The fertigation system of any of aspects 19-26, wherein the fertigation composition comprises a fertilizer composition comprising a NPK 11-29-19 Grade fertilizer composition; a fertilizer dissolving agent comprising sulfuric acid; and water.

Aspect 28. The fertigation system of any of aspects 19-27, wherein the fertigation composition comprises a calcium ion, wherein the calcium ion content is about 300 ppm.

Aspect 29. The fertigation system of any of aspects 19-28, wherein the fertigation composition comprises a fertilizer composition comprising NPK 14-38-10 Grade fertilizer composition; a fertilizer dissolving agent comprising sulfuric acid; and water.

F. Experimental

The following examples are put forth so as to provide those of ordinary skill in the art with a complete disclosure and description of how the compositions, articles, devices and/or methods claimed herein are made and evaluated, and are intended to be purely exemplary of the invention and not intended to limit the scope of what the inventors regard as their invention. Efforts have been made to ensure accuracy with respect to numbers, such as, for example, amounts, temperature, etcetera, but some errors and deviations should be accounted for. Unless indicated otherwise, parts are parts by weight, temperature is in ° C. or is at ambient temperature, and pressure is at or near atmospheric. Several methods for preparing the compounds of this invention are illustrated herein. Starting materials and the requisite intermediates are in some cases commercially available, or can be prepared according to literature procedures or as illustrated herein.

The following general methods of the present invention were used. The methods are provided herein to illustrate the invention, and should not be construed as limiting the invention in any way.

1. Example 1

During pre-start up, irrigation water was analyzed for pH and calcium ion content; the tank, pump, and piping were well-maintained and clean; the mixing tank line-up was secured, and the pump was properly connected to a power source. The pump discharge valves were closed, as were the water filling valve and all drains. The water filling valve was opened, and the fertigation tank was charged with irrigation water to the required level. Sulfuric acid or phosphoric acid, or a mixture thereof, the proper quantity of which was determined from the calcium content and pH of the irrigation water, was added to the water in the water tank. The proper quantity is determined by the desired percent of fertilizer composition and the desired pH. The correlation between the percentage of fertilizer composition, pH, and calcium content can be seen in Tables 1-2. The water pump was started on minimum flow to mix the sulfuric acid with the water for 10-15 minutes, and then stopped. The fertilizer composition was added in a quantity equivalent to 10% of water weight (or volume) in the fertigation tank. The mixture was allowed to settle without stirring in the fertigation tank for between 8 and 24 hours, after which the water pump was activated as a stirrer to circulate the mixture inside the fertigation tank for 30 minutes minimum. The fertilizer composition was drawn, in dosages, into the main irrigation line and ultimately into the crops, by the open discharge valves. At the end of the process, the equipment was drained of all liquids, and fresh water was used to clean out the fertigation tank and fertigation equipment. Once the equipment was free of liquids, the fertilization pump was turned off.

2. Example 2

The fertigation composition of example 2 is shown in Table 1. The fertilizer composition used in Table 1 is Granular Grade 11-29-19 Compound Fertilizer composition. The fertilizer dissolving agent comprises 95-98 wt % sulfuric acid. A commercial grade sulfuric acid is used. Depending on the commercial grade sulfuric acid, impurities can comprise calcium, chloride, aluminum, cadmium, copper, or zinc, but the total concentration of the impurities does not exceed 2-5 wt %, fulfilling the balance of the weight for the fertilizer dissolving agent. Various percentages of fertilizer dissolving agent at various pH values were added to the fertilizer as shown in Table 1.

TABLE 1

Fertilizer dissolving agent/Fertilizer composition Weight Percentages Using Granular Grade 11-29-19 Compound Fertilizer composition

| pH | $[Ca^{2+}]$ (ppm) | % FDA in 10% Granular NPK in Water | % FDA in 20% Granular NPK in Water | % FDA in 30% Granular NPK in Water | % FDA in 40% Granular NPK in Water | % FDA in 50% Granular NPK in Water |
|---|---|---|---|---|---|---|
| 6.5-7.0 | <100-300 | 2.5 | 3.5 | 4.5 | 6.5 | 7.5 |
|  | 300-600 | 3.0 | 4.0 | 5.0 | 7.0 | 8.0-8.5 |
|  | 600-1000 | 3.5 | 4.0 | 5.0 | 7.0 | 8.5 |
|  | >1000 | 4.0 | 5.0-5.5 | 6.0 | 8.0 | 9.0 |
| 7.0-7.5 | <100-300 | 3.0 | 4.0 | 5.0 | 7.0 | 8.0 |
|  | 300-600 | 3.5 | 4.5 | 5.5 | 7.5 | 8.5 |
|  | 600-1000 | 3.5-4.5 | 5.0 | 6.0 | 8.0 | 9.0 |
|  | >1000 | 4.0 | 5.0 | 6.0 | 8.0 | 9.0-10.0 |
| 7.5-8.0 | <100-300 | 3.5 | 4.5 | 5.5 | 7.5 | 8.5 |
|  | 300-600 | 3.5 | 4.5 | 5.5 | 7.5 | 8.5 |
|  | 600-1000 | 3.5 | 4.5 | 5.5 | 7.5 | 8.5 |
|  | >1000 | 4.0 | 5.0-5.5 | 6.0 | 8.0 | 9.0-10.0 |
| 8.0-8.5 | <100-300 | 3.5 | 4.5 | 5.5 | 7.5 | 8.5 |
|  | 300-600 | 3.5 | 4.5 | 5.5 | 7.5 | 8.5 |
|  | 600-1000 | 3.5 | 4.5 | 5.5 | 7.5 | 8.5 |
|  | >1000 | 4.0 | 5.0 | 6.0 | 8.0 | 9.0 |
| >8.5 | <100-300 | 3.5 | 4.5 | 5.5 | 7.5 | 8.5 |
|  | 300-600 | 3.5 | 4.5 | 5.5 | 7.5 | 8.5 |
|  | 600-1000 | 4.0 | 5.0 | 6.0 | 8.0 | 9.0 |
|  | >1000 | 4.5 | 5.5-6.0 | 6.5 | 8.5 | 9.5-10.0 |

Fertilizer dissolving agent—FDA

3. Example 3

The fertigation composition of example 3 is shown in Table 2. The fertilizer composition used in Table 1 is Granular Grade 14-38-10 Compound Fertilizer composition. The fertilizer dissolving agent comprises 95-98 wt % sulfuric acid. A commercial grade sulfuric acid is used. Depending on the commercial grade sulfuric acid, impurities can comprise calcium, chloride, aluminum, cadmium, copper, or zinc, but the total concentration of the impurities does not exceed 2-5 wt %, fulfilling the balance of the weight for the fertilizer dissolving agent. Various percentages of fertilizer dissolving agent at various pH values were added to the fertilizer composition as shown in Table 2.

TABLE 2

FDA/Fertilizer composition Weight Percentages Using Granular
Grade 14-38-10 Compound Fertilizer composition

| pH | $[Ca^{2+}]$ ppm | % FDA in 10% Granular NPK in Water | % FDA in 20% Granular NPK in Water | % FDA in 30% Granular NPK in Water | % FDA in 40% Granular NPK in Water | % FDA in 50% Granular NPK in Water |
|---|---|---|---|---|---|---|
| 6.5-7.0 | <100-300 | 3.0 | 4.5 | 5.5 | 8.5 | 10 |
| | 300-600 | 3.5 | 4.5 | 5.5 | 8.5 | 10 |
| | 600-1000 | 3.5 | 5.0 | 6.5 | 8-9 | 10-10.5 |
| | >1000 | 4.0 | 5.5 | 7.0 | 9.5 | 10.5-11.0 |
| 7.0-7.5 | <100-300 | 3.0 | 5.0 | 7.0 | 8.5 | 10.0 |
| | 300-600 | 3.5 | 5.5 | 6.5 | 8.5 | 10.0 |
| | 600-1000 | 3.5-4.5 | 6.0 | 6.5 | 8.5 | 10.5 |
| | >1000 | 4.0 | 6.5 | 7.0 | 9.0 | 11.0 |
| 7.5-8.0 | <100-300 | 3.5 | 5.5 | 7.5 | 9.0 | 11.0 |
| | 300-600 | 3.5 | 5.5 | 8.0 | 9.5 | 11.5 |
| | 600-1000 | 3.5-4.0 | 6.0 | 8.5 | 9.5 | 11.5-12.0 |
| | >1000 | 4.0 | 6.5-7.0 | 9.0 | 10.0-10.5 | 12.0 |
| 8.0-8.5 | <100-300 | 3.5 | 5.0 | 7.0 | 9.0 | 11.0 |
| | 300-600 | 3.5 | 5.5 | 7.5 | 9.5 | 11.5 |
| | 600-1000 | 3.5-4.0 | 5.5 | 7.5 | 9.5 | 12.0 |
| | >1000 | 4.0 | 5.5-6.0 | 7.5 | 9.5-10.0 | 12.0 |
| >8.5 | <100-300 | 3.5 | 5.0-5.5 | 7.0 | 9.0 | 11.0 |
| | 300-600 | 4.0 | 5.5 | 7.5 | 9.5 | 11.5 |
| | 600-1000 | 4.0-4.5 | 5.5 | 7.5-8.0 | 9.0-10.5 | 11.5 |
| | >1000 | 4.5 | 5.5-6.0 | 8.0 | 9.5-10.0 | 12.0 |

Fertilizer Dissolved Agent—FDA

4. Example 4

Table 3 shows the batch process parameters as process steps 1, 2, 3, and 4. The process steps occurred in numerical order. Table 3 shows what occurred at each process step, the flow rate (L/min) at each process step, the changing composition, and the temperature. In process step 1, water was added to the fertigation tank, as shown in FIG. 1, at a temperature of 25° C., a flow rate of 50-100 L/min, and a pH at about 8.3. In process step 2, the fertigation tank was recycled or stirred as a closed system. Also, in process step 2, the water was mixed with a fertilizer composition and a fertilizer dissolving agent at a flow rate of 50-100 L/min. The addition of the fertilizer dissolving agent raised the temperature and lowered the pH to a range between 1 to 3, due to the addition of the acid. In process step 3, the tank outlet was adjustable with a variable flow rate ranging from 5-10 L/min. Also, in process step 3, the pressure ranged from 3.5 bar to 4.5 bar. In process step 4, the fertigation composition flowed to the irrigation line.

TABLE 3

Parameters
Batch Process Example

| | Process | | | |
|---|---|---|---|---|
| Item | 1 | 2 | 3 | 4 |
| | Water feed | Tank recycle (Closed System) | Tank outlet (Adjustable) | Main irrigation line |
| Flow Rate (L/min) | 50-100 | 50-100 | 5-10 (variable) | — |
| Composition | | | | |
| Water % | 100 | 86-87 | 86-87 | 99.65-99.3 (variable) |
| FDA % | 0 | 3-4 | 3-4 | 0.15-0.2 (variable) |
| Fertilizer % | 0 | 10 | 10 | 0.2-0.5 (variable) |
| Temperature ° C. | 25 | 35-40 (at FDA addition) | 25 | 25 |
| Pressure (bar, (psi)) | Variable | | 3.5-4.5 bar (50-65 psi) | <3.5-4.5 bar (50-65 psi) |
| pH | 8.3 | 1-3 | 1-3 | 5.5-6.5 |

Fertilizer Dissolving agent—FDA

5. Example 5

Table 4 shows the fertigation tank contents after mixing has been completed. The flexible hose fixed inside the mixing tank allowed for the stirring of the tank. One aspect of this stirring mechanism can be seen at FIG. 1.

The results in Table 4 show that after mixing was completed in the fertigation tank, the fertigation composition had achieved full dissolution and homogeneity.

TABLE 4

Fertigation tank content analysis after mixing completed

| Sample ID | N % | $P_2O_5$ % | $K_2O$ % | $Ca_{ppm}$ | $Mg_{ppm}$ |
|---|---|---|---|---|---|
| Nutrients concentrations by calculation | 1.1 | 2.9 | 1.9 | 50 kg of NPK grade (11:29:19) was mixed in 500 Lit capacity tank (10%). Tank was leveled with irrigation water after addition of the solvent | |
| Upper layer of fertigation tank (lab analysis) | 1.0 | 2.41 | 1.7 | 279 | 367 |
| Lower layer of fertigation tank (lab analysis) | 1.2 | 2.4 | 1.7 | 278 | 378 |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for fertigation comprising:
   a) providing an acidic mixture comprising water and an acidic fertilizer dissolving agent;
   b) contacting the acidic mixture with a NP, PK, or NPK fertilizer composition in fertigation equipment to dissolve the NP, PK, or NPK fertilizer composition and to form a NP, PK, or NPK fertigation composition; and
   c) contacting the NP, PK, or NPK fertigation composition with soil,
   wherein the acidic mixture comprises at least 100 ppm of $Ca^{+2}$.

2. The method for fertigation of claim 1, further comprising cleaning the NP, PK, or NPK fertigation composition from the fertigation equipment.

3. The method for fertigation of claim 1, wherein providing the acidic mixture further comprises:
   a) filling a fertigation tank with water to a required level;
   b) checking the pH and the calcium content of the water to determine the pH and the calcium content of the acidic mixture;
   c) adding the fertilizer dissolving agent; and
   d) repeating steps b and c, as necessary, until a pH of the acidic mixture is from 5.0 to 9.5 has been reached.

4. The method for fertigation of claim 1, wherein contacting the acidic mixture with the NP, PK, or NPK fertilizer composition further comprises:
   a) resting the NP, PK, or NPK fertigation composition for a period of time ranging from about 8 hrs to about 36 hrs; and
   b) mixing the NP, PK, or NPK fertigation composition in the fertigation tank for a period of time ranging from about 30 minutes to about 90 minutes.

5. The method for fertigation of claim 1, wherein contacting the NP, PK, or NPK fertigation composition with soil further comprises:
   a) dispensing the NP, PK, or NPK fertigation composition in dosages; and
   b) charging the NP, PK, or NPK fertigation composition to an irrigation line.

6. The method for fertigation of claim 2, wherein cleaning the NP, PK, or NPK fertigation composition further comprises:
   a) flushing an irrigation line with water; and
   b) sending the NP, PK, or NPK fertigation composition to an irrigation line.

7. The method for fertigation of claim 1, wherein
   a) the NP, PK, or NPK fertilizer composition is present in an amount ranging from about 10 wt % to about 50 wt %, based on the NP, PK, or NPK fertigation composition;
   b) the fertilizer dissolving agent is present in an amount ranging from about 2 wt % to about 88 wt %, based on the NP, PK, or NPK fertigation composition; and
   c) water is present in an amount ranging from about 2 wt % to about 88 wt %, based on the NP, PK, or NPK fertigation composition.

8. The method for fertigation of claim 1, wherein the fertilizer dissolving agent comprises hydrochloric acid, nitric acid, phosphoric acid, or sulfuric acid or a combination thereof.

9. The method for fertigation of claim 1, wherein the fertilizer dissolving agent is phosphoric acid, or sulfuric acid or a combination thereof.

10. The method for fertigation of claim 1, wherein the fertilizer dissolving agent is sulfuric acid.

11. The method for fertigation of claim 1, wherein the fertilizer dissolving agent does not comprise hydrochloric acid or nitric acid.

12. The method for fertigation of claim 1, wherein the fertigation equipment comprises an irrigation tank or a portable fertigation tank.

13. The method of claim 1, wherein the fertigation equipment used for carrying out the method comprises:
   a) a fertigation storage-mixing tank having an inlet for receiving one or more fertigation components from a source;
   b) a fertigation pump having an inlet in fluid communication with the fertigation storage-mixing tank and having a pump discharge outlet;
   c) a recirculation loop in fluid communication with said pump discharge outlet and having a terminal recirculation loop discharge end located within said storage-mixing tank and defining a recirculation discharge inlet; and
   d) a fertigation feed line in fluid communication with said pump discharge outlet and having a terminal fertigation discharge end in communication with a downstream irrigation system;
   wherein the equipment is selectively operable in a first and second operable configuration,
   wherein, in the first operable configuration, the fertigation pump inlet is in fluid communication with the fertigation storage mixing tank; the recirculation loop is in fluid communication with the pump discharge outlet; and the fertigation feed line is not in fluid communication with the pump discharge outlet, such that the equipment is configured to recirculate one or more fertigation components within the fertigation storage-mixing tank; and wherein, in the second operable configuration, the fertigation pump inlet is in fluid communication with the storage mixing tank; the recirculation loop is not in fluid communication with the pump discharge outlet; and the fertigation feed line is in fluid communication with the pump discharge outlet, such that the equipment is configured to feed a dosage of one or more fertigation components to the downstream irrigation system.

14. The method for fertigation of claim 1, wherein the NP, PK, or NPK fertilizer composition is a NPK fertilizer composition, and wherein the NP, PK, or NPK fertigation composition is a NPK fertigation composition.

15. The method of claim 1, wherein the acidic mixture comprises 200 to 1000 ppm of $Ca^{+2}$.

16. The method of claim 3, wherein the pH is 7.5 to 9.5.

17. A NP, PK, or NPK fertigation composition comprising:
   a) a NP, PK, or NPK fertilizer composition, wherein the NP, PK, or NPK fertilizer composition is present in an amount ranging from about 10 wt % to about 50 wt %, based on the NP, PK, or NPK fertigation composition;
   b) a fertilizer dissolving agent comprising sulfuric acid or phosphoric acid, or a mixture thereof, wherein the fertilizer dissolving agent is present in an amount ranging from about 2 wt % to about 88 wt %, based on the NP, PK, or NPK fertigation composition; and
   c) water, wherein the water is present in an amount ranging from about 2 wt % to about 88 wt %, based on the NP, PK, or NPK fertigation composition,
   d) $Ca^{+2}$, wherein $Ca^{+2}$ is present in an amount of 100 to 1000 ppm.

18. The NP, PK, or NPK fertigation composition of claim 17, wherein the fertilizer dissolving agent does not comprise hydrochloric acid or nitric acid.

19. The NP, PK, or NPK fertigation composition of claim 17, wherein the NP, PK, or NPK fertigation composition comprises a NP, PK, or NPK fertilizer composition comprising a NPK 11-29-19 Grade fertilizer composition, wherein the NP, PK, or NPK fertilizer composition is present in an amount of about 35 wt % to 60 wt %, based on the total weight of the NP, PK, or NPK fertigation composition; a fertilizer dissolving agent comprising sulfuric acid, wherein the fertilizer dissolving agent is present in an amount of about 4.5 wt % to 7.5 wt %, based on the total weight of the NP, PK, or NPK fertigation composition; and water in an amount of about 30 wt % to 50 wt %, based on the total weight of the NP, PK, or NPK fertigation composition.

20. The NP, PK, or NPK fertigation composition of claim 17, wherein the NP, PK, or NPK fertigation composition comprises a NP, PK, or NPK fertilizer composition comprising a NPK 14-38-10 Grade fertilizer composition, wherein the NP, PK, or NPK fertilizer composition is present in an amount of about 30 wt % to 60 wt %, based on the total weight of the NP, PK, or NPK fertigation composition; a fertilizer dissolving agent comprising sulfuric acid, wherein the fertilizer dissolving agent is present in an amount of about 4 wt % to 12 wt %, based on the total weight of the NP, PK, or NPK fertigation composition; and water in an amount of about 30 wt % to 50 wt %, based on the total weight of the NP, PK, or NPK fertigation composition.

21. The NP, PK, or NPK fertigation composition of claim 17, wherein the fertilizer dissolving agent is sulfuric acid.

22. The NP, PK, or NPK fertigation composition of claim 17, wherein the NP, PK, or NPK fertilizer composition is a NPK fertilizer composition, and wherein the NP, PK, or NPK fertigation composition is a NPK fertigation composition.

23. The method of claim 17, wherein the acidic mixture comprises 200 to 1000 ppm of $Ca^{+2}$.

* * * * *